Figure 15:
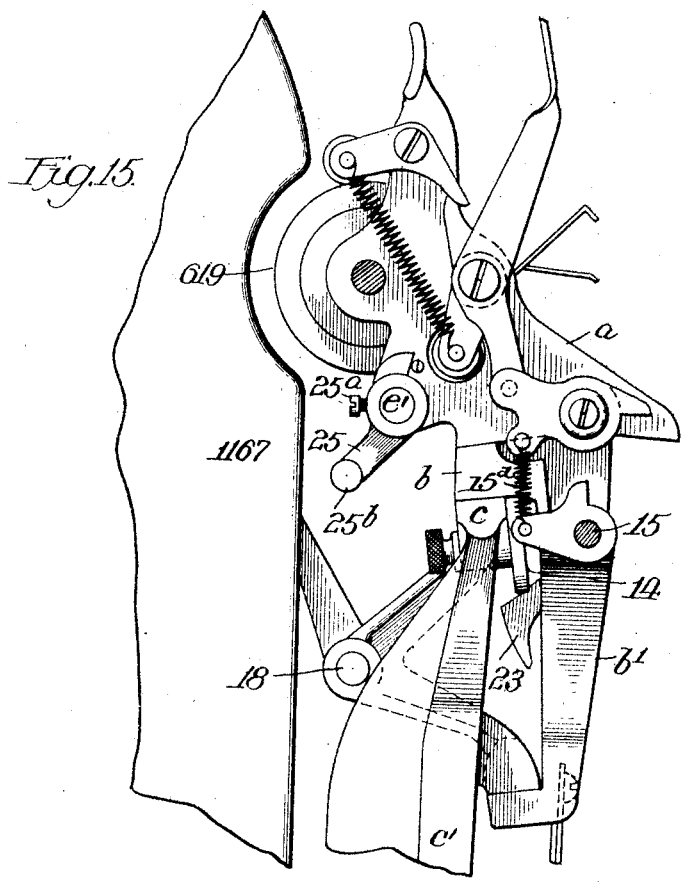

H. C. PETERS.
CALCULATING MACHINE.
APPLICATION FILED MAY 12, 1904.
1,028,133.
Patented June 4, 1912.
12 SHEETS—SHEET 1.
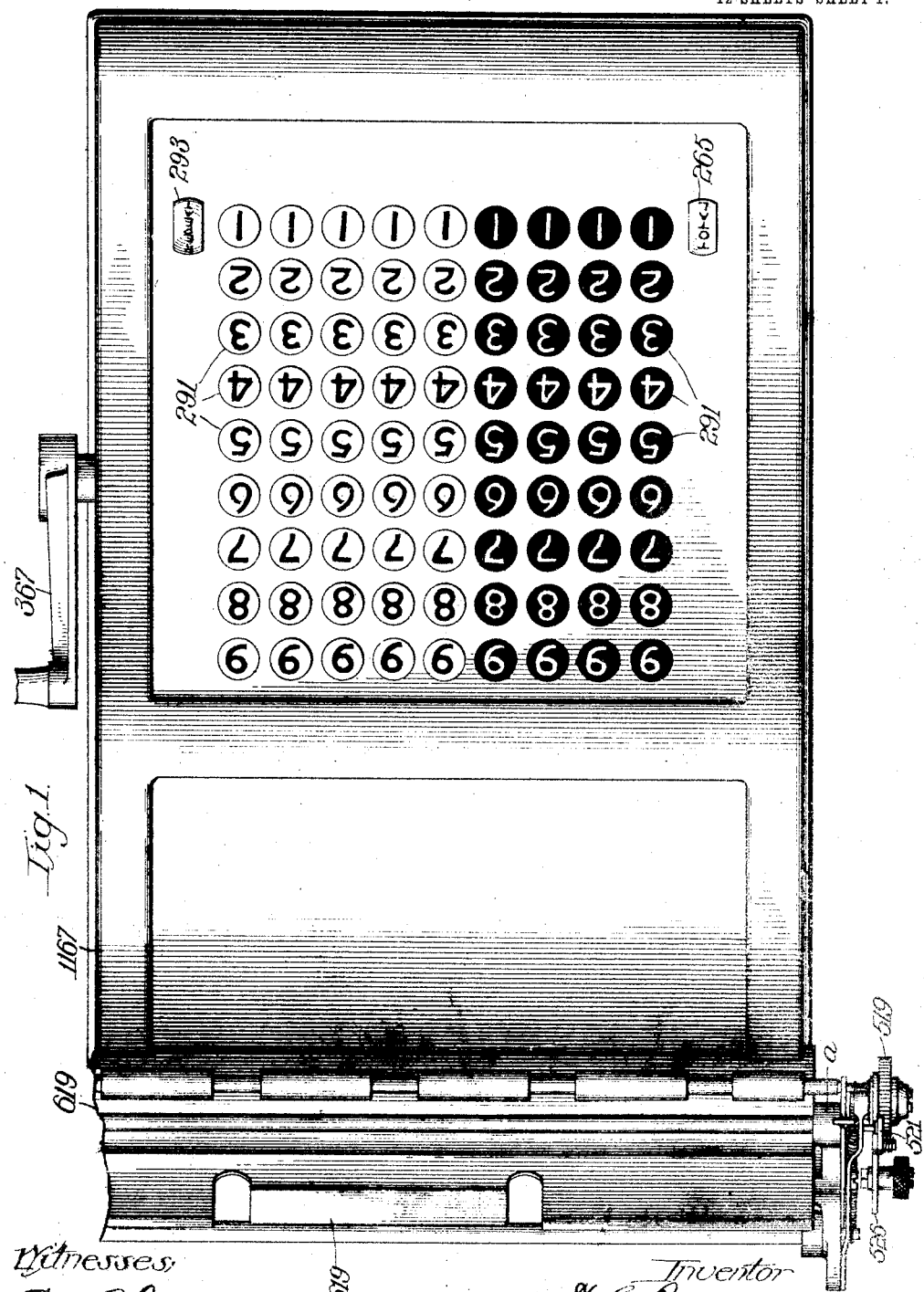

H. C. PETERS.
CALCULATING MACHINE.
APPLICATION FILED MAY 12, 1904.
1,028,133.
Patented June 4, 1912.
12 SHEETS—SHEET 2.
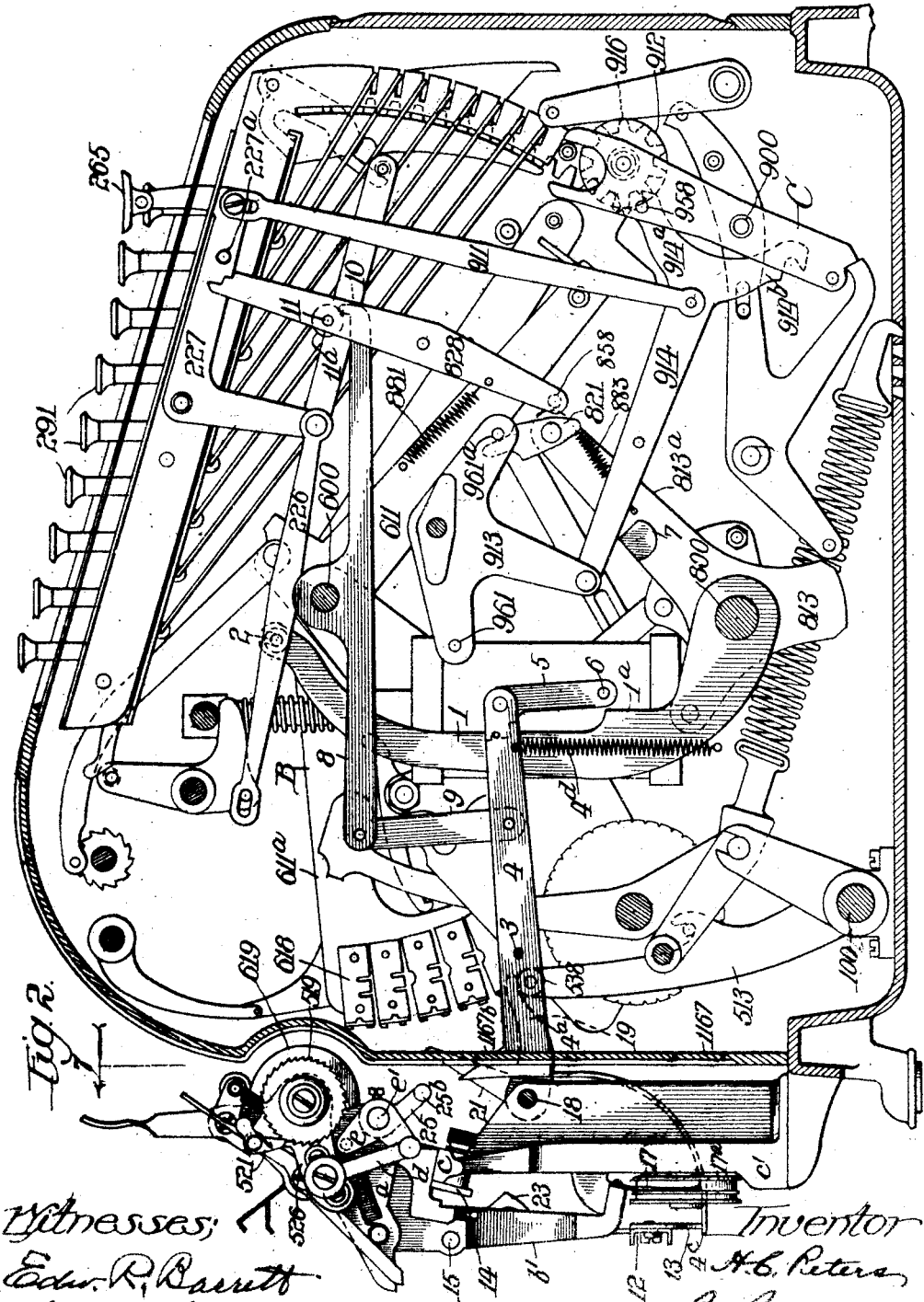

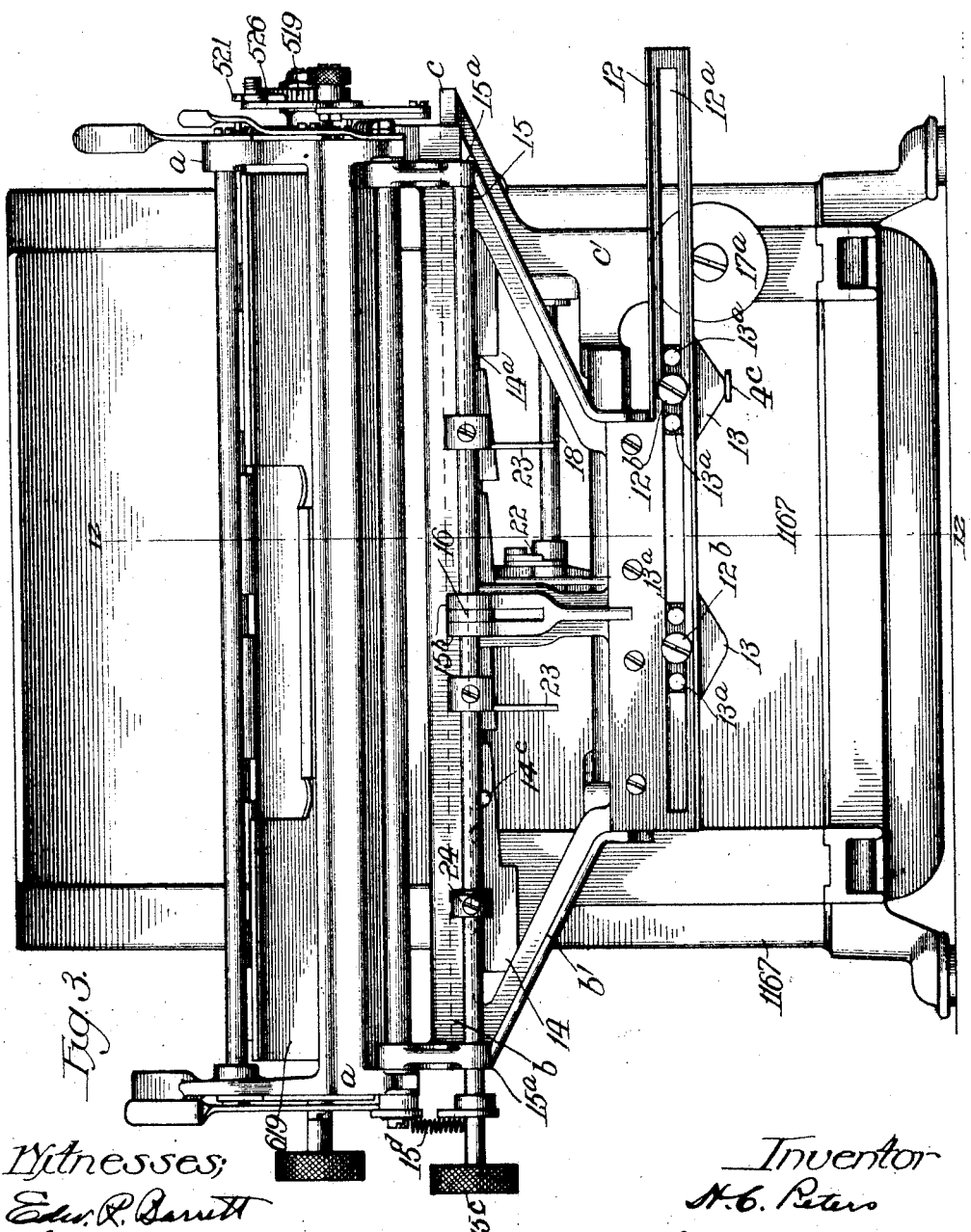

H. C. PETERS.
CALCULATING MACHINE.
APPLICATION FILED MAY 12, 1904.
1,028,133.
Patented June 4, 1912.
12 SHEETS—SHEET 4.
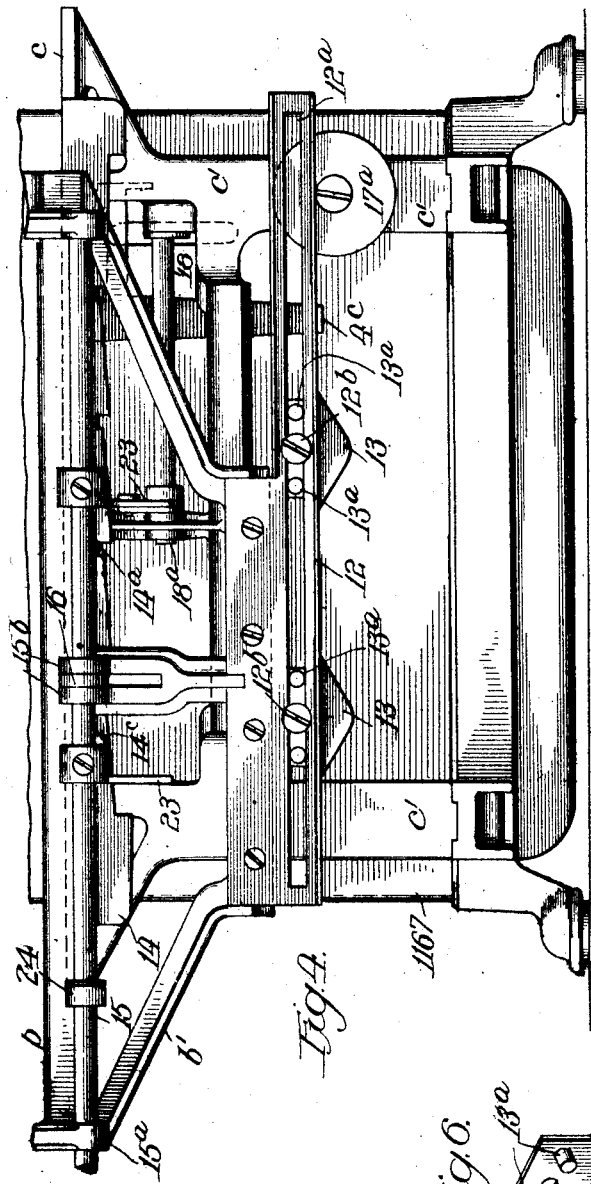
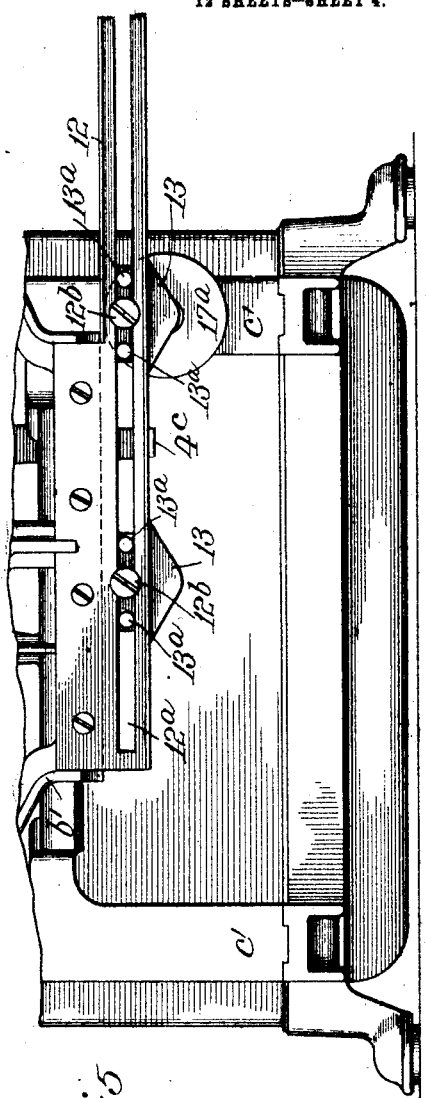
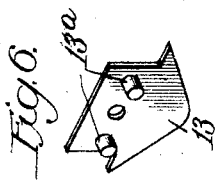
Witnesses:
Louis B. Erwin
Amelia Williams
Inventor
H. C. Peters
By Rector & Kissam
His Atty's

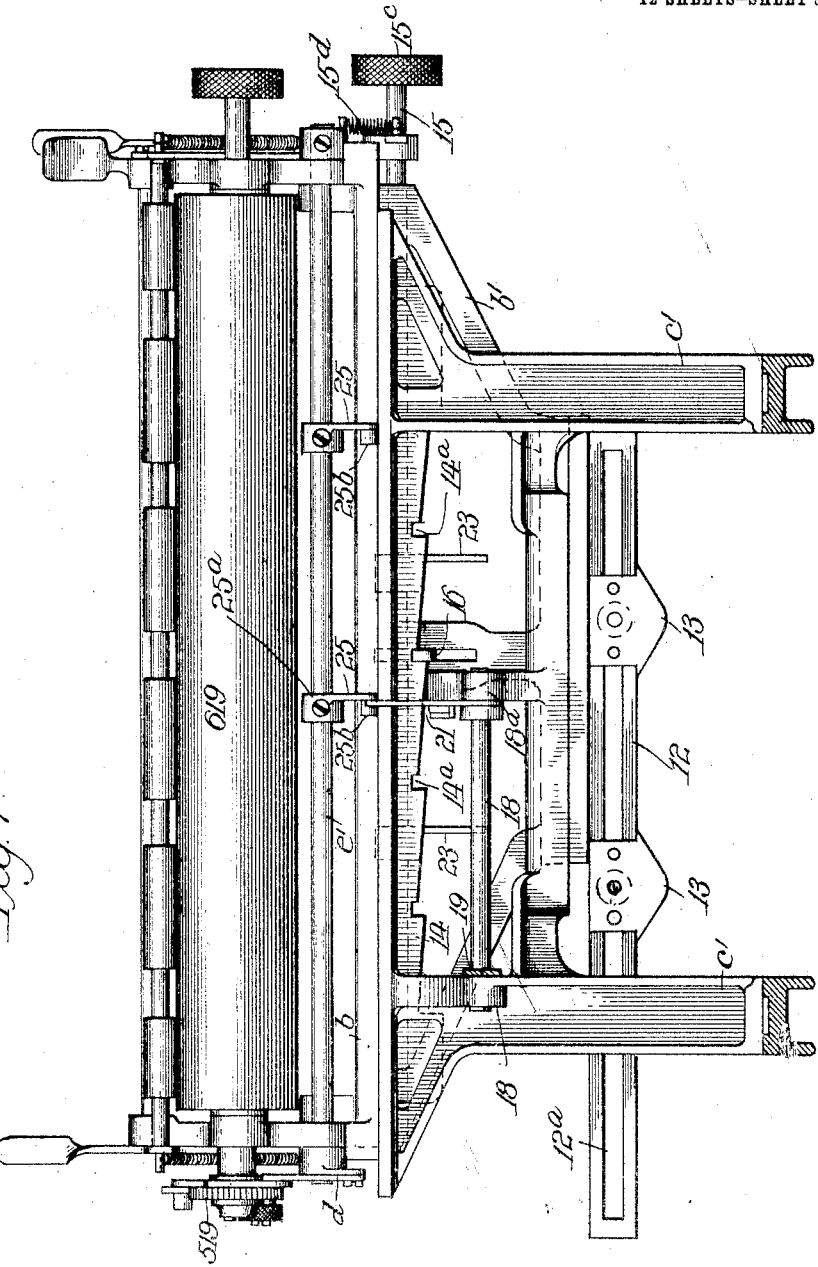

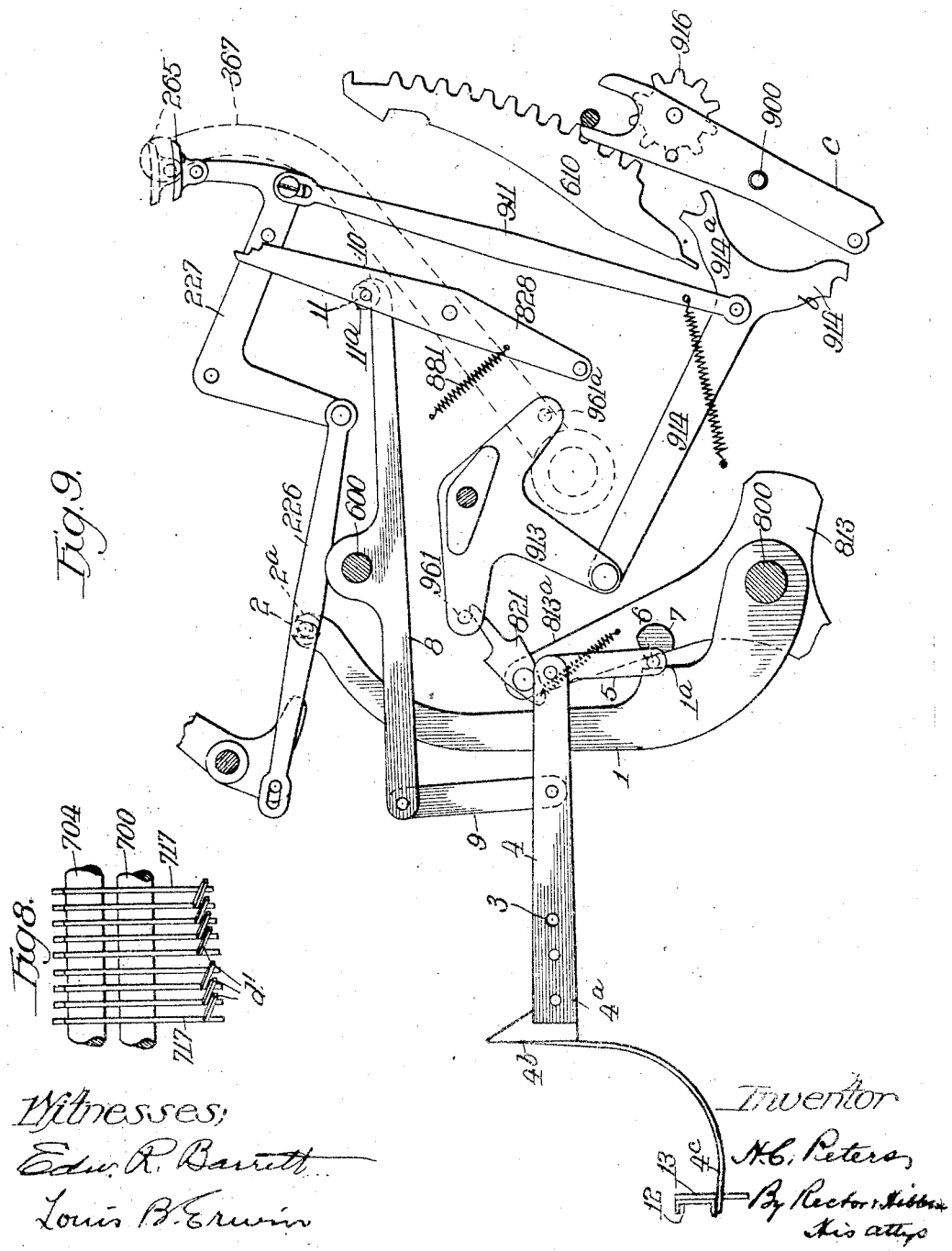

H. C. PETERS.
CALCULATING MACHINE.
APPLICATION FILED MAY 12, 1904.
1,028,133.
Patented June 4, 1912.
12 SHEETS—SHEET 7.
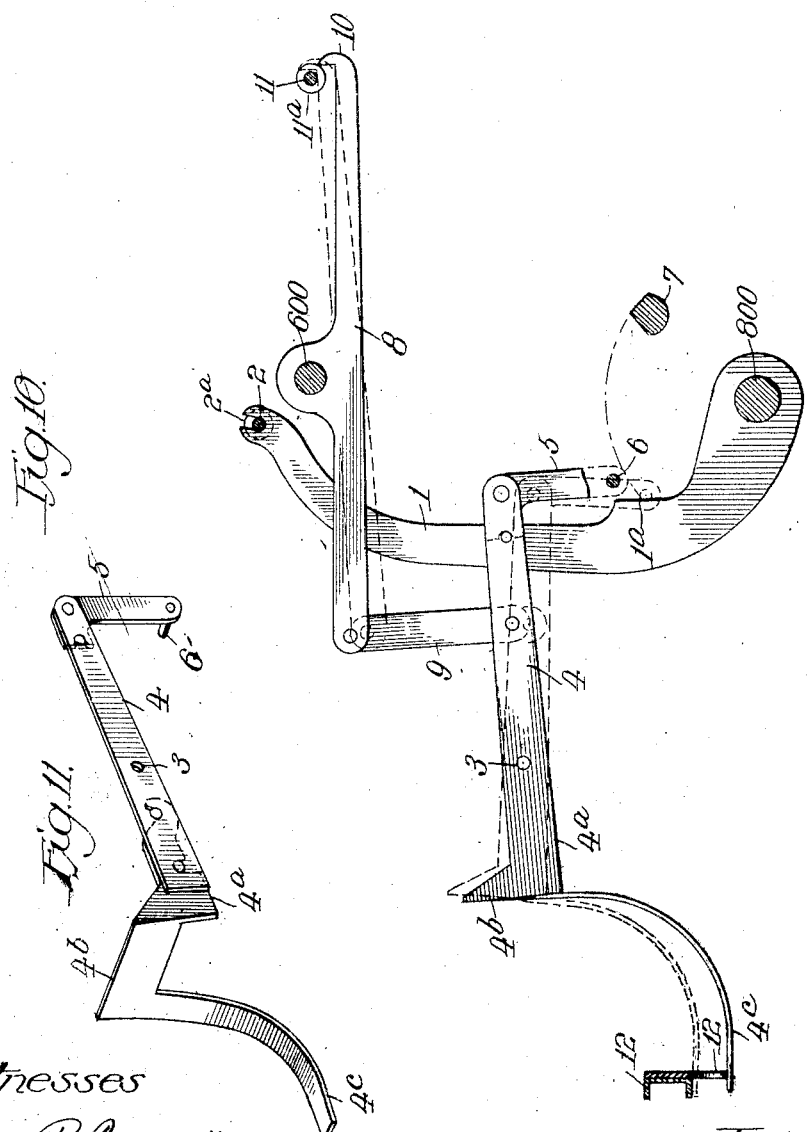

H. C. PETERS.
CALCULATING MACHINE.
APPLICATION FILED MAY 12, 1904.
1,028,133.
Patented June 4, 1912.
12 SHEETS—SHEET 8.
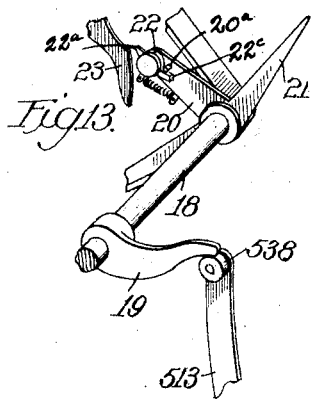
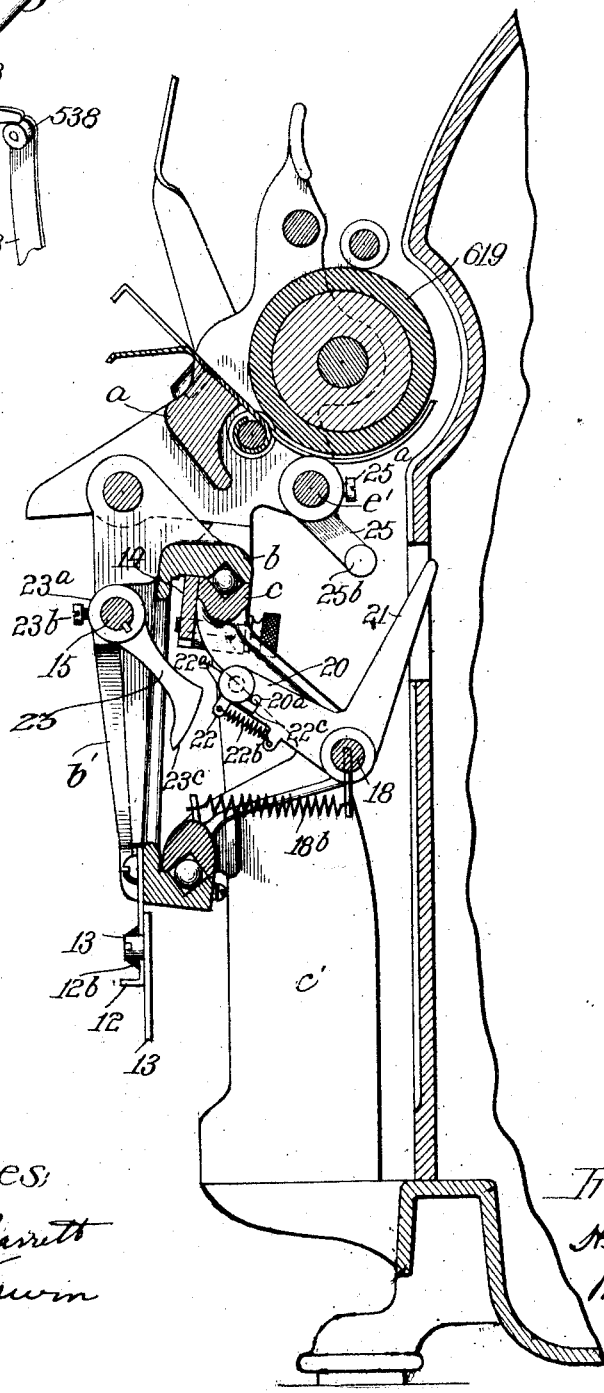

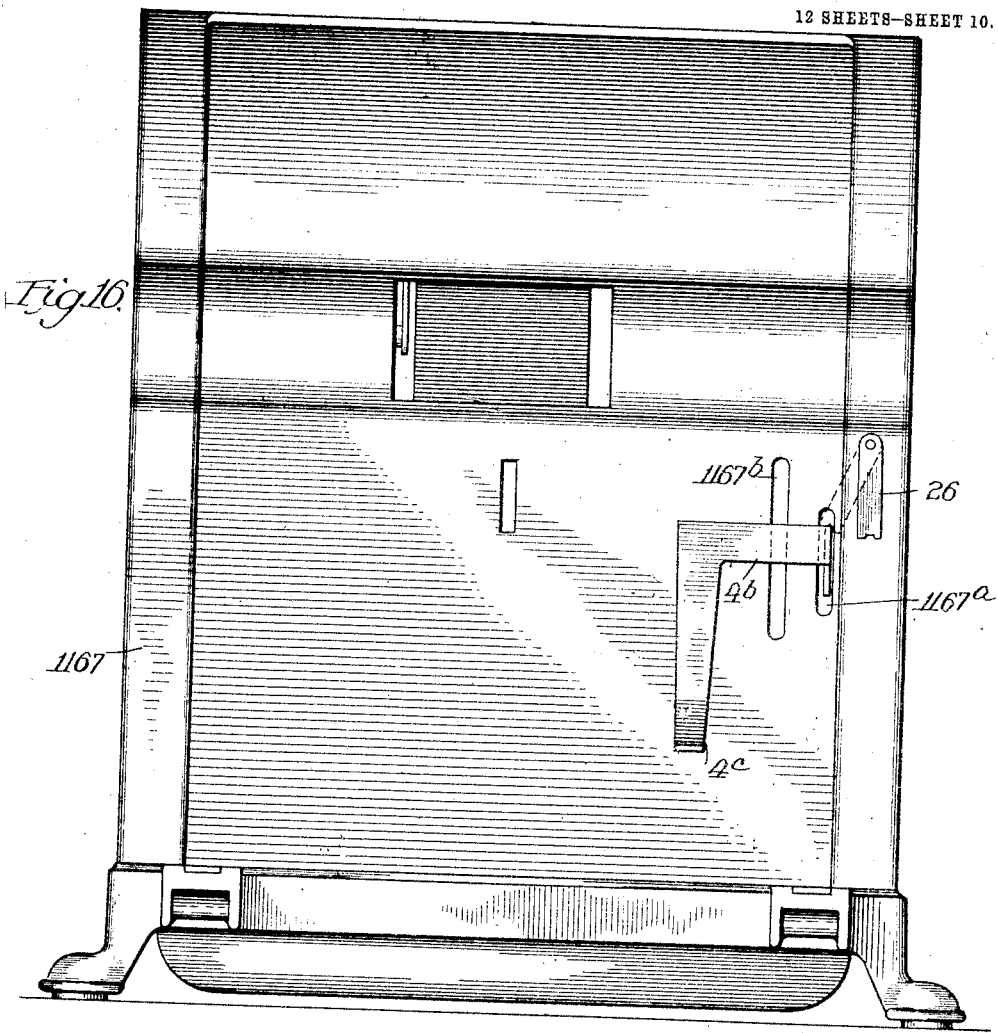

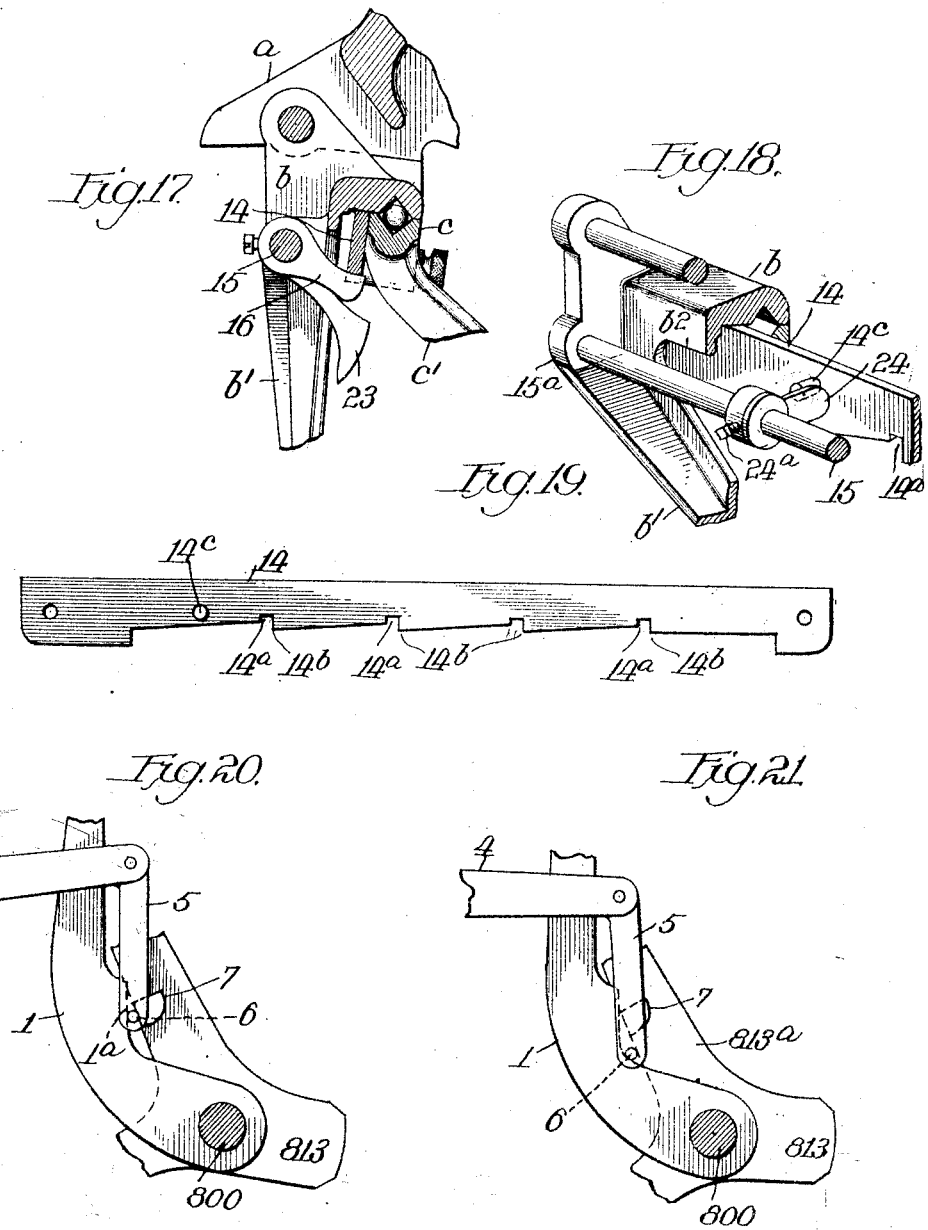

Fig. 22

PER DIEM REPORT

Of _____ Freight Cars on _____ Railway

Month of February 1904

| Car Initials | Number | Days per Diem | Days Penalty | Remarks | Car Initials | Number | Days per Diem | Days Penalty | Remarks |
|---|---|---|---|---|---|---|---|---|---|
| | | | | | | | 239 | 39 | |
| | 2140 | 24 | 10 | | | 105 | 6 | | |
| | 550 | 5 | | | | 716 | 5 | | |
| | 730 | 15 | | | | 16 | 6 | | |
| | 670 | 4 | | | | 2177 | 3 | | |
| | 3220 | 1 | | | | 1377 | 23 | 6 | |
| | 1471 | 12 | | | | 2057 | 11 | | |
| | 461 | 10 | 1 | | | 1417 | 10 | | |
| | 901 | 13 | | | | 608 | 2 | | |
| | 2611 | 9 | | | | 2538 | 6 | | |
| | 1911 | 29 | | | | 1958 | 14 | 14 | |
| | 7372 | 6 | | | | 628 | 16 | | |
| | 2892 | 11 | | | | 2569 | 5 | | |
| | 592 | 1 | 1 | | | 1609 | 2 | | |
| | 202 | 8 | | | | | | | |
| | 143 | 6 | | | | | 348 | 59 | |
| | 1693 | 2 | | | | | | | |
| | 2734 | 2 | | | | | | | |
| | 714 | 5 | | | | | | | |
| | 1834 | 18 | 14 | | | | | | |
| | 2524 | 2 | | | | | | | |
| | 2894 | 2 | | | | | | | |
| | 2315 | 10 | | | | | | | |
| | 1785 | 8 | | | | | | | |
| | 1605 | 19 | | | | | | | |
| | 115 | 17 | 13 | | | | | | |
| | | 239 | 39 | | | | | | |

| Total Days | Rate | Amount | |
|---|---|---|---|
| 348 | 20 cents | 69 | 60 |
| 59 | 80 " | 47 | 20 |

Total Amount due 116. 80

_____ Supt. Car Service

Witnesses:
Edw. R. Barrett
Louis B. Erwin

Inventor
H. C. Peters
By Rector & Kitten
His Attys.

UNITED STATES PATENT OFFICE.

HEBER C. PETERS, OF INDIANAPOLIS, INDIANA, ASSIGNOR, BY MESNE ASSIGNMENTS, TO BURROUGHS ADDING MACHINE COMPANY, OF DETROIT, MICHIGAN, A CORPORATION OF MICHIGAN.

CALCULATING-MACHINE.

1,028,133.  Specification of Letters Patent.  Patented June 4, 1912.

Application filed May 12, 1904. Serial No. 207,631.

*To all whom it may concern:*

Be it known that I, HEBER C. PETERS, a citizen of the United States, residing at Indianapolis, Marion county, Indiana, have invented certain new and useful Improvements in Calculating-Machines, of which the following is a specification.

My invention relates to what are commonly known or designated as calculating machines, and the same is more particularly intended as an improvement upon or attachment for the "Burroughs" adding machine, illustrated and described, for instance, in Letters Patent of the United States Nos. 504,963 and 505,078, issued on September 12, 1893, to the American Arithmometer Company on the inventions of William S. Burroughs, and more especially that type of Burroughs adding machine having a laterally movable paper carriage such as illustrated and described, for instance, in Letters Patent of the United States No. 595,864, issued on December 21, 1897, to said American Arithmometer Company on the invention of William H. Pike, Jr. However, my invention is not to be understood as limited in its application to a Burroughs machine, inasmuch as the same may be embodied in calculating machines of similar character and used for similar purposes.

The main object of my invention is to provide means, controlled by the movements of the paper carriage, for eliminating or throwing out of action the adding mechanism proper of the machine, with the result that at a certain position or positions of the carriage, as may be predetermined by the operator, the adding machine will be permitted to exercise all its functions, that is the printing and adding of amounts or items, in the usual and well known manner, and at a certain other position or positions of the carriage, the adding feature or function of the machine will be thrown out of action, but without interference with its usual functions of printing. The means which I have provided for thus throwing the adding function of the machine out of action may be normally operative with respect to the regular mechanism of the machine and be rendered inoperative, or the reverse arrangement may be provided, that is, such means may be normally inoperative and be rendered operative when desired, as determined by the particular position of the paper carriage. I have herein illustrated both arrangements, but the former one is now preferred.

The adding machine embodying my invention and as it is herein shown and described is therefore capable of printing in two or more columns, one or more only of which columns are to be added, that is to say, the machine is adapted to print on the same horizontal line, for example, a number or numbers not to be added, and then one or more amounts requiring to be added by the machine, which addition of said amounts may be either cross-addition or vertical addition, as desired. In the present instance, the machine is capable of printing a number not required to be added and then, in a succeeding operation, printing on the same horizontal line and, by one movement of the operating handle, two sets of amounts which are to be added. The machine is, therefore, adapted by repetitions of such operations to print and list a plurality of columns of numbers and amounts. The number of such columns is dependent simply upon the capacity or size of the paper carriage of any particular machine.

An adding machine embodying my invention is adapted for use in recording transactions or accountings where a number or numbers are to be printed in connection with one or more amounts, all of which different classes are to be printed and listed in succession (that is, without printing and listing each set or class separately), although only the amounts or items are to be added or accumulated. There is a considerable variety of accounting work where such a machine will find useful application and, for the purpose of affording a definite description and clear comprehension of my invention, I will explain it in connection with one of its many particular uses, that is, in railway car accountant's work. As is well known, in such particular kind of work, railroads keep accounts with each other as to their respective cars, such accounts setting forth the numbers of the cars, the number of days such cars have respectively been on the tracks of the railroad making such account, and in addition, the number of days that the cars have respectively remained on the tracks after the expiration of a time limit, usually thirty days, which particular number of days, in excess of such time limit, is known in railroad parlance as "penalty days." It is required, in this car accounting, that the number of the car, the number of days on track and the number of penalty days shall be printed in successive arrangement and on the same horizontal line, and that the numbers of the cars shall not, of course, be added, but that the other classes of items, that is the days, shall be independently added or accumulated. In the present instance, and as the machine is herein shown adjusted, I provide for printing and listing two sets of these three columns of numbers and added items on the same sheet of paper, making six columns altogether, but as hereinbefore stated the number of columns is dependent only upon the size or capacity of the movable paper carriage of any particular machine. Again, in the present instance, I provide for the printing of each of the numbers not requiring adding (the car numbers in the example mentioned) by one operation of the machine and for the printing of the two classes of the amounts or items requiring addition (the two classes representing days in the example mentioned) separately in the same horizontal line by a single but subsequent operation of the machine, and the same is true as to the totaling or subtotaling of the columns of these particular items representing days. To this end, the machine is in effect split or separated into two adding machines acting independently so far as printing, listing and adding are concerned.

The principal feature of my invention therefore comprises mechanism associated with an adding machine and controlled by the position and movement of a laterally movable paper carriage for eliminating or throwing out of action the usual adding feature of such machine, leaving such machine, under these conditions, to perform its usual functions of printing, and, furthermore, my invention relates to and comprises, in the present instance, certain mechanism associated with the movable paper carriage for securing, in automatic manner, both a horizontal feed of the carriage for columnar spacing and a vertical feed of the paper thereon at any predetermined time, or position of the carriage, in order to render the machine adaptable to specific or special requirements of different kinds of accounting work, as well as to render the machine as automatic as possible. Thus, besides controlling the action of the adding mechanism of the machine and thereby determining whether the machine shall or shall not add, the paper carriage is arranged and adapted to control both the columnar spacing and the line feed of the platen, in a manner hereinafter made apparent.

For the purpose of distinguishing the numbers which are to be added and those which are not to be, I will, throughout this specification, refer to the former class as "numbers" and to the latter class as "amounts" or "items."

Figure 14:
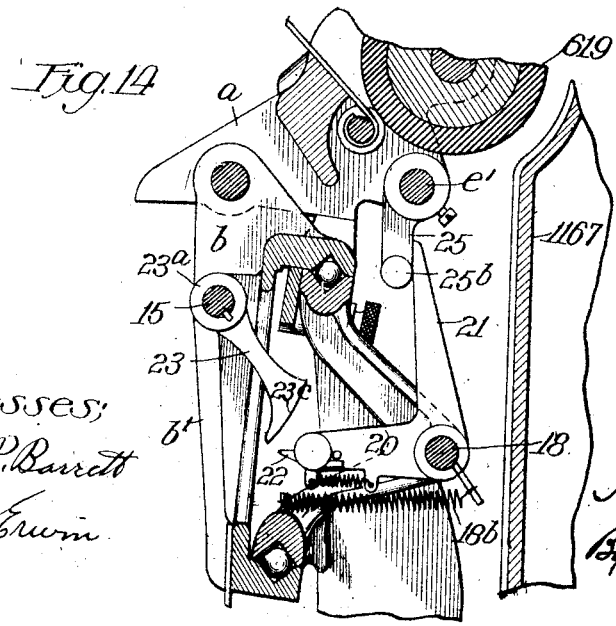

In the drawings, Figure 1 is a plan view of my machine; Fig. 2 a sectional elevation of the left hand side of the machine, the section being taken just inside of the case and the frame of the machine; Fig. 3 a rear elevation of the machine; Figs. 4 and 5 rear elevations of the machine, illustrating different positions of the carriage; Fig. 6 a perspective of one of the cams or projections on the carriage; Fig. 7 a sectional elevation on the line 7 of Fig. 2 looking rearwardly; Fig. 8 a detail view of the latches of the printing mechanism; Fig. 9 a detail view of my added parts together with certain of the old parts of the machine; Fig. 10 a similar view but of my added parts alone; Fig. 11 a perspective of the controlling lever and interfering stud; Fig. 12 a section on line 12 of Fig. 3; Fig. 13 a detail view of certain of the parts of Fig. 12 concerned in columnar spacing; Fig. 14 a view similar to Fig. 12 but illustrating a different position of the parts; Fig. 15 an elevation of the right hand end of the paper carriage; Fig. 16 a rear elevation of the machine case with the carriage and its supporting frame removed; Figs. 17 and 18 detail views of certain portions of the carriage mechanism; Fig. 19 a view of the tabulating bar detached; Figs. 20 and 21 views illustrating a modified form of construction; and Figs. 22, 23 and 24 views showing different samples of the work done on my machine.

Inasmuch as the Burroughs machine as manufactured and as disclosed in said prior patents is well known as to both its construction and mode of operation, and as my invention comprises mechanism additional to such machine, a detailed description of the entire Burroughs machine is rendered unnecessary, and it will therefore suffice to describe only those parts which are associated or concerned more or less directly with my invention.

As usual, the key board has a plurality of rows of keys 291, extending from front to rear of the machine, there being, in the present instance, eighty one keys on the keyboard, arranged in nine rows of nine keys each. The nine keys in each row represent the nine digits and the respective rows represent different denominations increasing from right to left. As herein shown, my machine is split or divided into two separate adding machines, by omission of a certain part as hereinafter explained, and to this end the rows of keys associated with the right and left hand divisions of the machine are by preference made distinguishable from each other, as by contrasting colors. In the present instance the right hand division of the machine comprises five of the rows of keys and, as the keyboard is now made, such particular rows of keys are colored white, while the four remaining rows of keys, comprised in the left hand division of the machine, are colored black. The keyboard is provided with the usual "repeat" key 293 to enable any number to be repeated without resetting the proper keys on the keyboard, and also with the usual "total" key 265, controlling the operation of the printing mechanism to print a total, thereby enabling a total to be taken whenever desired by the operator.

The levers B, which correspond in number with the rows of keys, are hung upon the main rock shaft 600, Fig. 2, and are each provided with the rearwardly extending sector-shaped arms 611$^a$ carrying the usual movable type plates 618, and provided with forwardly and downwardly extending arms 611 operatively connected with gear-toothed racks 610. For a detailed description of the means for controlling the movements of these racks, reference may be made to said prior Burroughs patents.

The series of racks 610 coöperate with a corresponding series of adding wheel pinions 916, to each of which is secured an adding or dial wheel 912. These pinions and adding wheels are mounted in a swinging frame consisting of the two arms C arranged at opposite sides of the machine and secured to a rock shaft 900 journaled in the frame thereof. In the usual operation of the Burroughs machine (except when totaling) this pinion frame is swung bodily forward out of mesh with the racks 610 upon the forward movement of the operating handle 367 and the consequent downward movement of the particular racks released, but such pinion frame will be swung into mesh with such racks upon the rearward movement of the operating handle and the consequent upward movement of the released racks, with the result that the pinions and adding wheels, corresponding to the particular racks released, will be turned by such racks distances corresponding to the previous downward movement thereof.

The swinging of the pinion frame into and out of mesh with the racks 610 is controlled by the movements of the arm 914 and the three-armed lever 913, to which the former is pivoted at its rearward end. In order to support the forward end of this arm 914 and to put it under the control of the "total" key, the same is pivotally connected to the lower end of the long substantially-vertical link 911 which is operatively connected at its upper end to the bell crank 227 of the "total" key 265. The front end of the arm 914 has two diverging arms or branches 914$^a$ and 914$^b$ adapted to coöperate with the pinion frame in the well known way, with the result that when the "total" key is depressed and kept in that condition during the forward and rearward movement of the operating handle, that is, a complete stroke thereof, the machine is caused to print a grand total, and when such key is kept depressed during only the forward movement of the operating handle and released just prior to the rearward or return movement thereof, the machine is caused to print a subtotal.

Upon the rock shaft 800, which is actuated by the operating handle 367, is mounted a three-armed lever 813, whose upwardly and forwardly extending arm 813$^a$ carries a pivoted wiper-block 821 adapted to coöperate with the studs 961 and 961$^a$ on the rearwardly and forwardly extending arm of the lever 913. The spring 883 tends to swing the wiper block into alinement with the arm 813$^a$, and in the position of the parts as indicated in Fig. 2 such spring holds the upper end of the wiper-block against the rear side of the forward stud 961$^a$. Inasmuch as my added mechanism or attachments are directly associated with the old parts now being described and affect their usual or normal operation, I will explain such normal operation, which is as follows: When the operating handle is drawn forwardly, the shaft 800 is rocked in an anti-clockwise direction (Fig. 2), and the wiper-block consequently caused to engage the stud 961$^a$ and force forwardly the depending arm of the lever 913, with the result that the connecting lever 914, by the engagement of its branch arm 914$^a$ with the stud 958, swings the pinion frame C forwardly and the pinions out of gear with their racks 610, so that the racks may descend without turning the pinions. On the rearward or return movement of the operating handle, the shaft 800 is rocked back to normal position, and during such back movement, the wiper block 821 will engage the other stud 961, and by thereby forcing the rearwardly extending arm of the lever 913 upwardly, the lever 914 will be drawn back to normal position and with it the pinion frame C because of the engagement of the notched end 914$^a$ with the stud 958 on such frame, with the result that the pinions will be put in mesh with their racks and turned thereby distances corresponding to the previous downward movement of the respective racks. During the forward movement of the operating handle the racks and the forward ends of the particular levers B released through the medium of the keyboard and connections, descend distances determined by the value of the particular keys operated, while the rearward ends of such levers are raised so as to present at the printing line the types corresponding to the operated keys. At the end of such forward movement of the operating handle, the types are forced against the platen, by means of strikers as described in said Burroughs patent, to effect the printing of the amount represented by the operated keys.

In the foregoing description, I have not taken into consideration the means provided in Burroughs machines for preventing the depressing of the "total" key after the movement of the operating handle is begun, but the same will now be described inasmuch as they are concerned with the operation of my attachment. These means comprise the pivoted locking arm 828 having a spring 881 tending to force the upper end of such arm forwardly and into the path of the stud 227ª on the bell crank 227 of the "total" key. Normally, however, the arm 813ª bears against the stud 858 of the lever 828 and thereby restrains the spring, with the result that normally the upper end of the arm 828 is held out of the path of movement of the stud 858, and the "total" key permitted to be depressed. But on the first movement of the operating handle and consequent rearward movement of the arm 813ª the spring 881 throws the upper end of arm 828 forwardly against and into the path of such stud. By these means, the "total" key is locked against depression.

It will be understood that the ordinary Burroughs machine is so made that when a key in any one of the rows thereof beyond the outermost one on the right hand side is set and the machine operated, a series of ciphers will be printed to the right of the figure or figures making up the printed item. This action is brought about by the successive tripping, from left to right, of latches 717, to which end such latches (excepting the outermost one on the right hand side) have projecting lugs $d'$ to cause interference between the latches, whereby the tripping action is communicated successively to release the hammers, causing a printing of the figures of those type plates corresponding to operated keys and a printing of ciphers by those levers whose keys have not been operated. In the present instance these latches are similar in construction and operation to those already explained as usual in the Burroughs machine with the exception that the said interference of latches is destroyed in suitable manner at one point, and to this end the lug $d'$ of the sixth latch corresponding to the sixth row of keys counting from the right is removed or dispensed with, as shown in Fig. 8 herein. However, it will be obvious that the interruption of coöperative relationship of latches might be at any other point.

The result of the change just mentioned is to split or divide the machine into two machines or divisions, capable of separate printing, listing and adding, whereby two separate items may be set up on the keyboard of the machine and separately printed and added with one operation of the operating handle. The effect of thus dispensing with the lug $d'$ on one of the latches will be quite evident for, as will be understood, the tripping action of the latches of the left hand division of the machine will not be communicated to the right hand division thereof, with the result that ciphers cannot be printed on the left of any figures printed by the right hand division of the machine. The machine shown therefore constitutes two separate adding machines assembled and associated together and operated in unison by an operating handle common to both machines.

The paper carriage and platen roller 619 and their associated parts are, in general, the same as those shown in said prior Pike patent. The platen roller is mounted in the ends of a frame $a$ which is arranged to swing on the carriage $b$. This carriage travels on a track $c$ formed at the upper end of a supplemental frame $c'$ extending from the machine frame and has a downward extension or framework $b'$ upon which is mounted various devices forming parts of my new mechanism as hereinafter explained.

The longitudinal or transverse feed of the paper carriage will be described later on, inasmuch as it concerns more or less the new mechanism of the machine. The vertical paper feed or line spacing is also concerned with such new mechanism, but the main operating parts may nevertheless be referred to at this point. The platen roller at its left hand end has secured to it a ratchet 519, with which coöperates a spring-pressed pawl 521 carried by a bell crank shaped plate 526 hung upon the spindle of the platen roller. The pivoted plate 526 is connected by means of a link $d$ to the arm of the bell crank $e$ which is secured to the end of the longitudinal rock shaft $e'$ suitably mounted in the swinging carriage frame. Rocking of the shaft $e'$, in an automatic manner as hereinafter set forth, causes the pawl 521 to advance the platen roller a line space, whose amount is determined by the particular point of attachment of the link $d$ to the plate 526.

With the exception of the suggested change as regards the tripping of the latches, the machine above described is substantially the Burroughs machine, after which description the operation, function and relation of the added parts, now to be explained, will be quite readily understood. For the purpose of distinguishing the new from the old parts contained within the case I have, in Figs. 2 and 9, shaded the new parts but left the old parts in simple out-line, while in Fig. 10 I have shown such new parts by themselves.

Upon the rock shaft 800 is hung or pivoted the lower end of a lever arm 1 whose body portion is substantially straight and vertical and whose ends are both forwardly curved or turned. The lower end of this lever arm is pivoted on the rock shaft 800 as described, while the upper end is slotted or bifurcated (for convenient assembling) to receive and engage a pin 2 on the inner side of the usual link 226 forming one of the connections associated with the "total" key of a Burroughs machine. This pin has an enlarged head or flange $2^a$ (Figs. 9 and 10) to prevent lateral movement of the upper end of the lever arm and thereby preserve its engagement with the pin. A portion of the front edge of the lever arm 1 is so shaped or extended forward toward its lower end as to present a bearing surface or interference face $1^a$ arranged to coöperate with other parts in a manner hereinafter explained. It is apparent that a rearward movement of the upper end of the lever 1 will cause a corresponding rearward movement of the link 226 in the same manner as the depression of the "total" key as indicated in Fig. 9, which movement or depression of the "total" key connections serves to eliminate or throw out the addition feature or function of the machine. This lever 1 is designed to be actuated, under certain conditions, by a moving part of the regular machine, and in the present instance this result is accomplished in the following manner: Pivoted at one end at the point 3 on the left hand side of the rearward portion of the machine is a substantially horizontal lever 4 which extends forwardly at one side of the lever arm 1 and just beyond the intermediate portion thereof. The lever 4 carries at its forward end a pivoted and depending bell crank shaped arm 5 from whose lower end there extends inwardly what I term an interfering stud 6 because of its interference under certain conditions with the operating parts in the manner hereinafter explained. This interfering stud is arranged in close proximity to the bearing surface $1^a$ and intersects its plane of movement. The lever 4 is held to downward position (which is normal in the construction exhibited in Fig. 2), by means of a coiled spring $4^d$ fastened at one end to the lever and at the other end to a fixed part of the machine, at which time the depending arm 5 is lowered with its interfering stud in operative position directly in front of the surface $1^a$, but when the machine is working as an ordinary Burroughs machine and consequently arranged to add or accumulate in the usual way, such lever is forced and held to the position indicated in Fig. 2.

The arm $813^a$ of the three armed lever 813, hereinbefore referred to, is provided on its outer face with a projection or block 7, so arranged and positioned thereon that when the operating handle is drawn forward to its full limit and the shaft 800 rocked in the manner already explained (and assuming that the lever 4 is in its downward or operative position shown in Fig. 9), the pinions will be thrown out of gear, as usual, upon the first movement of the operating handle by the swinging of the pinion frame due to the rocking of the three-armed lever 913 by the contact of the wipe block 821 against the stud $961^a$, as hereinbefore explained. Just before the extreme end of the forward stroke of the handle and the consequent extreme end of the rearward stroke of the arm 813 has been reached, the block 7 will contact the interfering stud 6 of the depending arm 5 and force the same against the surface $1^a$ of the lever arm 1, with the result that such latter lever arm will be rocked rearwardly and the total key connections operated to depress the lever 914 and release its hooked end or branch $914^a$ from the stud 958 on the pinion frame. As a result of these movements, the pinion frame is left out of gear with the racks 610, inasmuch as the branch $914^a$ of the lever 914 has been removed from operative relation with such stud 958. The adding feature of the machine is thus eliminated or thrown out of action in both the forward and rearward movements of the operating handle, so that the machine may be employed for simply listing and printing, without addition.

As hereinbefore explained in respect to the usual operation of a Burroughs machine, the locking arm 828 which is normally restrained from locking the "total" key in normal upward position, by means of the arm $813^a$, is rocked by its spring 881 at the first movement of the operating handle, but inasmuch as the operation of my attachment involves the depression of the "total" key, it becomes necessary, under such conditions, to continue the restraint of this locking arm, after the arm $813^a$ has moved away from its interfering position. For this purpose I provide means controlled by the movements of the controlling lever 4 and arranged to engage the arm 828 when such lever 4 is actuated. In the present instance, these means comprise a substantially horizontal locking lever 8 hung or pivoted intermediate its length on the shaft 600 and pivotally connected at its rearward end with a vertical link 9 whose lower end is, in turn, pivotally connected to the controlling lever 4, with the result that the movements of the latter lever are communicated to the locking lever 8. The extreme forward end of the locking lever is provided with an upwardly turned hook 10 which engages an inwardly directed stud on the arm 828. This stud by preference has an enlarged head or flange 11ª, so that the hook is held into operative engagement with the stud.

When the interfering stud 6 is in operative relation with the lever 1, as indicated in Fig. 9, this hook is in engagement with the stud 11 of the lever 828 and locks such lever against forward movement as to its upper end even when, in the operation of the machine, the arm 813ª has moved rearwardly. The result of this construction and arrangement is to throw the "total" key lock out of operation during the operation of the parts comprising my attachment, so that the "total" key and connections are permitted to be operated as required.

As hereinbefore mentioned, the mechanism for throwing out the adding feature or function of the machine is controlled by the movements and position of the paper carriage, so that in certain positions thereof the said mechanism is in operative condition and is rendered inoperative in other positions thereof, the particular lateral position of the carriage therefore determining whether such mechanism is operative or inoperative. To this end (and referring to the particular construction of Fig. 2), the rearward end of the controlling lever 4 is extended rearwardly through a vertical slot 1167ª in the rear wall of the case 1167 (Fig. 16) of the machine parallel to the usual slot 1167ᵇ in which ordinarily works a paper feed lever such as that designated T in said Pike patent but which in the present construction is occupied by a different part hereinafter described. In the present instance, for the sake of convenience in assembling, this rear end of the lever 4 is made of a separate piece which is attached to the main portion of the lever in suitable manner, and readily detachable at will. This end of the controlling lever is of irregular shape as seen in Fig. 11, the same comprising a forwardly extending portion 4ª projecting through said slot 1167ª, a right-angled portion or plate 4ᵇ extending laterally to the right just in rear of the rear wall of the machine case, and comprising also a depending portion or actuating finger 4ᶜ whose lower end is curved rearwardly and slightly upwardly in order to coöperate with the movable paper carriage, as hereinafter explained. This finger is adapted to move or rock in a vertical plane and the movement thereof is communicated to the lever 4 and depending arm 5 and its interfering stud 6, so as to raise and lower them.

Referring to Figs. 3, 4, 5 and 7, a long narrow plate 12 is secured to the lower end of the depending extension bʹ of the carriage frame and arranged in a horizontal position. This plate 12 is provided with a slot 12ª, extending almost its entire length, to receive the clamping screws 12ᵇ of the projections or cams 13, which depend from the lower edge of the plate 12 in position to operate the controlling lever finger 4ᶜ when the carriage is moved. As herein shown, (Fig. 3) each cam has two guide pins 13ª received by the slot 12ª and arranged to slide therein in the adjusting operation. A screw 13ᵇ serves to lock the cam in adjusted position. In the present instance, there are two of these cams which will enable six columns of different classes of numbers and values to be printed on a single sheet of paper, but it will be understood that a single cam may be employed or brought into operative relation in case either two or three columns of such different classes of numbers and amounts or values are to be printed, and also that the number of such cams may be increased according to desired increased capacity of the machine or increased number of columns.

The cams are adjustable longitudinally of the slot of the plate 12 to any desired position therein, but in practice such cams are adjusted to certain points along the plate 12 corresponding to different stop positions of the paper carriage as determined by a tabulating rail hereinafter described, with the result that when either one of the cams is in position to depress the actuating finger 4ᶜ as shown in Fig. 3, the paper carriage will be in proper position to receive an impression or impressions from the printing mechanism in a certain column or columns. These cams have sloping edges or sides which engage the finger 4ᶜ, which rides thereupon in both directions of travel of the paper carriage, and (referring to the structure exhibited in Fig. 2), the arrangement is such that when the carriage stops at a point corresponding to either one of the cams, the lower end or apex of the particular cam in question will bear against such finger 4ᶜ and force it downward to its full extent, thereby rendering my attachment inoperative and restoring the machine to its usual and normal condition as to the performance of its adding function. Referring to the construction now being described, when the finger 4ᶜ is in its uppermost position bearing against the lower edge of the plate 12, my attachment or mechanism is in operative relation in respect to the mechanism of the adding machine. The construction is therefore such that the attachment is alternately rendered operative or inoperative by the movements of the paper carriage.

The tabulating device comprises, in the present instance, a tabulating bar 14 arranged on the rear side of the supporting frame cʹ, on which the carriage track e is formed, and in fact at one side of such track as indicated in Fig. 12. As illustrated in detail in Fig. 19, this bar, which is preferably detachable, has a series of notches 14ª between which the edges of the bar preferably incline upwardly from the right to the left of the machine viewed from the operator's position, in order to enable the coöperating catch or locking dog to engage the notches with more certainty. This inclining of the edges of the bar forms a series of shoulders 14$^b$ constituting one side wall of the notches, which shoulders the locking dog contacts without entering the notches proper in case the stop arm, hereinafter described, is employed.

A rock shaft 15 is suitably mounted or journaled in end-bearing lugs 15$^a$ and middle bearing lugs 15$^b$ on the depending portion of the carriage frame, as seen in Figs. 3, 4 and 18, and the right hand end of which shaft is extended past its bearing and there provided with a knob 15$^c$ for manual manipulation. At approximately its middle point, this rock shaft is provided with a catch or locking dog 16 which is arranged to either engage the notches or come against the shoulders of the tabulating bar and hold the carriage at different points along the track, so that the platen roller will be presented to the printing mechanism at different predetermined columnar positions. This rock shaft 15 is normally spring-pressed, as by the spring 15$^d$, (Fig. 15) in such manner that its locking dog 16 will be normally held against the lower edge of the tabulating bar (Fig. 17) ready to drop into any notch and come against any shoulder presented to it. To avoid failure of this dog to engage a notch, and also to provide for back shifting of the carriage, the lower edge of the bar is inclined between the series of notches, as described, so that after the dog has been disengaged from one notch, it will bear against the inclined edge and be stopped by the shoulder of the next notch, and will drop into such notch except as it may be restrained by a stop hereinafter described.

By rocking the shaft 15 by turning the knob 15$^c$ by hand against the tension of its spring, the locking dog may be disengaged from one of the notches or shoulders of the tabulating bar, whereupon the connection 17 (Figs. 2 and 3) with the spring barrel 17$^a$ will draw the carriage to the left and, in case the operator immediately releases the rock shaft, the locking dog thereof will snap into the next adjacent notch, upon being struck by the next shoulder on the bar, and will hold the carriage in the next columnar position. However, the ordinary and intended operation of this rock shaft is not a manual one, as described, except for some special purpose, but is an automatic one, brought about by operating connections governed by the movements of the machine. To this end, the supporting frame $c'$ of the carriage mechanism is provided, on its forward side adjacent the casing of the machine and toward the left hand end, with a pair of bearing lugs 18$^a$ in which is mounted a short rock shaft 18, Figs. 2, 7, 12 and 14. This rock shaft has fastened to it a forwardly extending arm 19 which projects forward through the slot 1167$^b$ of the casing and whose curved free end normally rests upon the anti-friction roller 538 on the upper end of an operating arm 513 fast upon a rock shaft 100, whereby when the operating handle is moved and the shaft 100 thereby rocked, the arm 513 will rock the arm 19 upwardly.

The rock shaft 18 has toward its right hand end a bell crank, one arm of which forms a tripping arm 20 extending rearwardly and upwardly and the other arm a feed arm 21 extending forwardly and arranged to effect the vertical feed of the paper. The shaft is normally rocked forwardly by means of the spring 18$^b$ attached thereto.

Upon the outer end of the tripping arm 20 is mounted a pivoted wiper block or plate 22, Figs. 12 and 14, having a tripping finger 22$^a$ which is normally held projected rearwardly and outwardly in longitudinal alinement with its arm 20 by means of a spring 22$^b$. This tripping finger is adapted to be moved forwardly, that is clockwise when viewed as in Fig. 12, against the tension of its spring, and its movement in the opposite direction is limited by the contact of its stop finger 22$^c$ against the pin 20$^a$ on the arm 20.

The wiper block or plate 22 is arranged to actuate the rock shaft 15 under certain conditions, according to adjustment of parts, and to this end such rock shaft is provided with one or more tripping arms 23 which are adapted to move on such shaft and are adjustable longitudinally thereon for purposes hereinafter made apparent. As shown, each tripping arm 23 has a hub portion 23$^a$ which slides on the rock shaft, and is held to adjusted position by the set screw 23$^b$, and also has a forwardly and downwardly projecting finger or arm terminating in a foot 23$^c$ having a curved edge, which foot is adapted to stand in the path of movement of the tripping finger 22$^a$ of the wiper plate 22, with the result that when the arm 20 is rocked downwardly and the wiper plate 22 thereby carried bodily downward, the finger 22$^a$ will be rocked forwardly (clockwise in Fig. 12), by contact with the foot 23$^c$ of the tripping arm 23 without affecting the latter, but on the return stroke, caused by the spring 18$^b$, such finger 22$^a$, after being restored to normal position with its stop finger bearing against the pin 20$^a$, will bear, without yielding, against the foot 23$^c$ of the arm 23 and rock the same and its rock shaft 15 rearwardly, that is clockwise in Figs. 12 and 14. The result of this rocking of the shaft 15 by the mechanism just described the same as the hand manipulation by means of the knob at the end of such rock shaft, inasmuch as such rocking releases the locking dog thereof from engagement with the tabulating bar and permits the paper carriage to travel the distance of another columnar space. In this connection, it will be understood that the movements of the wiper plate and its arm are controlled by the movements of the operating handle, inasmuch as the movements of such handle are communicated through the arms 513 and 19 to the short rock shaft 18 and thus to the arm 20. The described arrangement is such that the wiper plate 22 does not move upward to perform its stated function until the beginning of the return or rearward stroke of the operating handle, so that the carriage will be permitted to move only after the machine has done the printing. Furthermore, it will be understood that any desired number of these tripping arms 23 may be employed according to the capacity or width of any particular paper carriage and also according to the particular number of columns to be printed on any single sheet of paper. However, in the present instance, two of such arms are shown for the purpose of doing the class of accounting work in connection with which my invention is being explained, although it will be understood that my invention is not limited to the employment of any particular number of such arms.

When two sets, for instance, of columns of figures are being printed and listed, I prefer to provide, on the rock shaft 15, a stop arm or finger 24 (Fig. 18) which is adjustably secured on said shaft by means of a set screw $24^a$. This stop finger is arranged on the shaft toward the right hand end thereof viewed from the operator's position and is adapted to coöperate with a rearwardly projecting stop pin $14^c$ on the tabulating bar 14. This pin is so positioned that it will stop or limit movement of the paper carriage to the right, to a point slightly beyond the position occupied by the carriage when ready to receive the imprint of the first column of the second set of numbers (that is the fourth column in the example of Fig. 22). By use of the knob $15^c$ the operator is enabled to shift the carriage by hand to its full extent to the right for the work on the left hand side of the paper. This stop arm possesses, under the present construction, a second function, in that it is adapted to bear against the lower edge of the transverse bar $b^2$ (Fig. 18) of the carriage frame and the adjustment of the arm on its rock shaft is such that it will prevent the locking dog 16 from entering any of the notches of the tabulating bar but permit such dog to contact any one of the shoulders $14^b$ thereof and thereby stop the carriage in different columnar positions. This arrangement enables the carriage to be returned to initial position by simply shifting the carriage back without having to first unlock it.

According to the construction herein shown, the stop pin $14^c$ stops or limits the movement of the paper carriage to the right its full length of travel, by contact of the middle bearing lugs $15^b$ thereagainst, when the operator shifts or restores the carriage to the right to original or initial position, ready for the next line of numbers or items. After the first set of columns (three in the present instance), has been printed and in order that the same may be continued on the right hand side of the sheet of paper or a new set of columns started, the operator, besides setting back the paper to the proper starting line, rocks the shaft 15 more than ordinarily so as to swing the stop finger or arm 24 below and around on the other side of the stop pin, whereupon the locking dog 16 strikes against the third shoulder on the bar, with the result that the stop finger 24 will now be positioned on the left hand side of the stop pin $14^c$ and will, by its contact with such pin, therefore serve to limit the required movement or feed of the paper carriage to the right during the printing of the said second set of columns. There is a slight play or movement between this position of the carriage as determined by the pin $14^c$ and finger 24 and its position as determined by the third notch or shoulder of the tabulating bar, so that the operator may return the carriage to the right until stopped as explained and then upon releasing the carriage and after a slight return movement of the same, the locking dog will engage the third shoulder and hold the carriage in position for receiving the impression in the first column of said second set.

The vertical paper feed is likewise automatic in that it is controlled by the moving parts of the machine, and in fact by the particular position of the paper carriage, and to this end the feed arm 21, already referred to, is adapted to actuate the paper feed devices hereinbefore described. The longitudinal rock shaft $e'$, hereinbefore referred to, is provided with one or more feed fingers 25 which are sleeved onto the shaft and arranged for both longitudinal and rotarial adjustment, each finger being secured in adjusted position by a set screw $25^a$. Each finger is provided with a laterally projecting stud $25^b$ against which the feed arm 21 bears when positioned in the path of movement thereof, with the result that in the forward movement of the operating handle and the consequent rearward movement of the feed arm 21, the particular feed finger 25 presented to such feed arm will be rocked rearwardly, thereby rocking the shaft $e'$ and shifting the pawl 521 forwardly, so that when the feed parts resume their normal position; in the usual way, such pawl, on its return movement, will advance or feed the paper vertically a distance of one space or line.

The feed fingers 25 are adjusted or positioned at any desired points on the rock shaft so as to obtain the vertical feed of the paper at the proper time and at a predetermined position of the paper carriage. In the present instance, in doing the particular class of accounting work referred to herein as an example, two of these fingers are employed in such relative position that they will be actuated respectively when the last column of each set of columns has been printed.

Inasmuch as it may be desired to temporarily employ the machine as an ordinary Burroughs, suitable means may be provided for holding and locking my attachment out of operative condition, and as herein shown, Fig. 16, I have provided a latch 26 pivoted on the rear wall of the machine case and arranged to be swung laterally to engage the operating lever 3 and hold it in depressed condition in the same manner as held by the cams.

In the foregoing description the functions of the various parts have been explained, but for a better understanding of the successive movements of the parts, I will now proceed to describe the mode of operation of the machine when arranged and adjusted, as herein shown, for railroad car accountants and doing the work of which Fig. 22 represents a sample, such sample being printed on a per diem report sheet of the well known form as commonly used by railroads for this character of accounts. In this sample, there are two sets or classes of columns of figures of three columns each, making a total of six columns. The first column of each set represents the serial number of the car, the next column the number of days the car has been on the tracks of the railroad company keeping the account, and the third column the number of penalty days, that is, the number of days in excess of the limit, which is 30 days according to code of regulations adopted by railroad companies.

Starting with the paper carriage in its right hand position, with the locking dog 16 engaging the first shoulder from the right hand end of the tabulating bar, it will be observed that the supplemental mechanism adapted to throw out the adding function of the machine is in operative position, inasmuch as, owing to the particular position of the carriage, Fig. 4, the operating arm or finger 4ᶜ is in its uppermost position bearing against the lower edge of the plate 12 and the depending arm 5 is in its lowermost position while the stud 6 is in interfering position, Fig. 9, with the result that the adding wheel pinions will not be permitted to return into mesh with the sectors 610 after being thrown out, as usual, at the first or forward movement of the operating handle. However, before this handle is operated the number of the first car (2140 in this example) is set up on the key board, so that when the handle is operated in the usual manner the machine will simply print the number 2140 without registering that number on the adding wheels because the adding function is now thrown out. It will be noted that in case the left hand division of the keyboard is used for the car numbers, no ciphers will be printed to the right of the number beyond the fourth row of keys counting from the left, inasmuch as the tripping action of the latches 717 is not communicated beyond the fourth latch corresponding to the fourth row of keys counting from the left, for the tripping lug of this fourth latch has been dispensed with.

In the forward stroke of the operating handle, the wiper plate 22ᵃ flips by the left hand one of the tripping arms 23 and on the rearward stroke thereof and immediately after the said printing of the car number, such plate rocks the arm rearwardly, consequently rocking the shaft 15 and disengaging the locking dog 16 from the first shoulder against the tension of the spring 18ᵇ. The carriage is now drawn to the left by the spring in the barrel 17ᵃ until the dog 16 contacts the second shoulder which determines the position for the second and third columns which are simultaneously printed by the machine. The carriage now occupies the position illustrated in Figs. 2 and 3 with the apex of one of the cams bearing against and forcing the operating finger 4ᶜ downwardly. It will be noted that, so far, the paper feed mechanism has not been operated.

In the travel or advancement of the carriage from its initial to its second position, just referred to, that is from the position shown in Fig. 4 to that of Fig. 3, the left hand cam 13 on the carriage forces the finger 4ᶜ downward and thereby renders my attachment inoperative inasmuch as such depression of this finger raises the stud 6 to non-interfering position, as indicated by full lines in Fig. 10, with the result that the machine operates like an ordinary Burroughs machine as to printing, listing and accumulating, with the exception that ciphers will not be printed to the right of a number set up on the left hand division of the key-board, as already explained.

Still referring to the example illustrated in Fig. 22, the operator sets up on the left hand division of the keyboard the amount (24) representing the number of days the particular car has been on the company's tracks, during the particular month being accounted for, and on the right hand division of the key-board the number (10) representing the penalty days. In this operation the first and second and the sixth and seventh rows of keys counting from the right are used, in which operation, as well as the succeeding printing and accumulating operations, the machine acts as two separate machines. The operator now draws the operating handle forward, as usual, with the result that on the forward stroke the numbers 24 and 10 are printed simultaneously with a blank space between them which ordinarily would be occupied by ciphers representing or corresponding to the unoperated third, fourth and fifth rows of keys. During the forward stroke of the handle, the feed arm contacts the left hand finger 25 and rocks its shaft $e'$, thereby rocking the pawl 521 forwardly, so that on the return stroke of the handle and restoration of the rock shaft $e'$ the pawl will engage the ratchet 519 and feed up the platen and paper thereon a line space of predetermined amount. In this particular stage of operation the locking dog is not operated, for, according to the present adjustment and arrangement of the machine, the end of the line or half line has been reached and the paper has been fed vertically ready for the next line of numbers. The operator now shifts the carriage to the right until one of the lugs $15^b$, or the supporting frame adjacent thereto, strikes the stop pin $14^e$ and then, upon the releasing of the carriage and after a slight return movement of the same, the dog 16 will come against the first shoulder $14^b$ toward the right hand side of the tabulating bar and hold the carriage in proper columnar position, that is initial position, so that the second car number can be printed. According to the present example per diems are reported against the second car but it so happens that there are no penalties, inasmuch as that car has not exceeded the 30-day limit. Consequently, the carriage having shifted after the printing of the second car number, the operator sets up the per diems on the left hand division of the keyboard and does nothing on the other division. The per diems are now printed and accumulated or added with the first per diems.

The operations above described may be repeated until the bottom of the sheet is reached and if it is desired to print on the same sheet of paper a second set of these columns, as shown in the example, Fig. 22, a sub-total is taken at the foot of the second and third columns by operating the total key in the well known way, with the result that upon actuating the operating handle both sub-totals will be simultaneously printed and on the same horizontal line. This sub-total may be carried to the head of the right hand side of the sheet, as seen in Fig. 22, and the operations hereinbefore described repeated until the work is completed or the sheet filled, whereupon a grand total may be printed at the foot of the fifth and sixth columns on the sheet. As shown in this example, the amount due has been calculated, the per diems at 20 cents per day and the penalties at 80 cents per day.

It will be observed that when it is desired to print on the right hand side of the sheet, as hereinbefore explained, the stop arm 24 is rocked by hand so as to take its position on the left hand side of the stop pin $14^e$, so that such arm and pin will coöperate to limit the extreme movement of the carriage to the right so far as the printing on the right hand side of the sheet is concerned, that is to say, the carriage may be drawn to the right by the operator slightly farther than necessary for printing the fourth column on the sheet, which is the first column of the second row of columns, Fig. 22, and after a slight return movement of the carriage the locking dog 16 will strike against the third shoulder from the right of the tabulating bar. In this position of the carriage, as indicated in Fig. 5, my new mechanism is in operative relation with the machine mechanism whereby the adding function thereof will be thrown out of action. When the carriage has traveled to its next columnar position, the second cam 12 will contact and depress the operating finger $4^e$ and render said new mechanism inoperative. Just after the printing operation in the last position of the carriage, the paper is fed vertically one space by reason of the actuation of the second feed arm 25 (the one on the right) by the main feed arm 513.

It will be understood that by adjusting the cams 13, tripping arms 25 and feed arms 23 to different positions and by providing additional cams and tripping and feed arms, various kinds of accounting work may be performed by the machine. For example, supposing it is desired that there be two columns and the numbers in only the first column are to be accumulated, the cam 12 will be so shifted or adjusted to the left from its present position as to be in position to depress the operating arm $4^e$ and render the new mechanism inoperative. The desired number is now printed on either division of the machine and transferred to the adding wheels. The carriage is now shifted automatically one columnar space or notch to the left, whereupon the arm $4^e$ is permitted to rise so that the new mechanism is brought into operative relation with the adding machine. The amount (not to be added) is now printed and the paper is fed vertically one line space. It is obvious that at the same time that the first number was printed, two amounts to be added, in different columns, could be simultaneously printed by using both divisions of the keyboard. So also, the combination or adjustment may be such that, in the printing of the numbers listed in three columns, the middle column only may be accumulated.

To illustrate the range of the character of work which may be done on my improved machine, even with the adjustable parts in their illustrated position, I have shown, in Figs. 23 and 24, two other samples of work, one having three columns and the other four columns. Referring to the sample of Fig. 23, the first two columns are numbers which are not to be added and in the present instance represent the month and day respectively, while the third column represents some value or amount. According to the sample of Fig. 23, the number of the month (12) and the day thereof (1) are set up on the left and right hand divisions respectively of the key board and such numbers are printed, but without accumulating, inasmuch as, at this time, the adding pinions are kept out of gear. The carriage is automatically advanced one columnar space to the left, at which time the adding function of the machine has been restored. According to the sample of Fig. 24, the first two columns represent the month and day thereof while the last two columns represent amounts or values, such as debits and credits, on accounts kept by merchants, for instance, where the customer's account is debited with the value of goods sold and credited with the value of goods returned, which debits and credits are separately added or accumulated, their difference representing the balance due on the account. It will be observed that these two additional samples of work have been produced without changing any of the adjustments of the machine as it is illustrated in the drawings, and it will be quite evident that the range and variety of the character of the work may be materially increased by different adjustments of the cams and the feed and tripping arms.

Another function possessed by my improved machine, as hereinbefore alluded to, is that of cross addition, that is, the totaling, at the end of a line, of amounts or items preceding in the same horizontal line. My machine is capable of thus cross-adding two or more amounts or items, as well as, if desired, printing one or more numbers or items not to be added, provided the proper adjustments of cams and paper feed arms are made and properly notched tabulating bar is used. Suppose that two numbers are to be cross-added, for example 222, and 333, making a total of 555, either division of the machine is employed for successively printing these two numbers, which are added on the adding wheels of the machine. Under the present example, my attachment is rendered inoperative during the printing of the numbers 222 and 333, for which purpose the two cams are properly adjusted, but it is immaterial whether the attachment is in operative or inoperative position when the total (555) is being taken. If, now, the numbers printed in the above example are to be preceded by a number not to be added, such particular number is first printed while said attachment is in operative condition, as determined by the carriage. The paper feed arms are so positioned on their rock shaft that only one of them will be operated and then only after the total has been taken.

In the machine hereinbefore described, the arrangement was such that my attachment was normally in operative relation with the machine mechanism and required to be removed from such position by the paper carriage. It is evident, after the disclosure already made, that the reverse arrangement might be provided, that is to say, my device or attachment may be normally inoperative but rendered operative by the movements of the paper carriage. Such reverse arrangement can be made in different ways, and in Figs. 20 and 21 I have illustrated a simple method to this end. In this modification, the only change in structure consists in lengthening the depending arm 5 (as compared with that of the other figures) so that its interfering stud 6 will normally be positioned below the path of movement of the contact block 7 on the lever 813, as shown in Fig. 21, with the result that normally such block will clear the stud and consequently will not operate the lever 1. When, however, the lever 4 is operated and its forward end raised, in the manner hereinbefore explained, the stud will be elevated to interfering position as shown in Fig. 20, and the lever 1 will be actuated when the lever 813 is rocked in the operation of the machine.

By reason of the particular construction of the tabulating bar and the fact that the locking dog is prevented from entering the notches, the carriage is stopped in its movement to the left at different columnar positions by contact of such dog against the shoulders formed on the bar, but such carriage is enabled to be shifted at once to initial position by simply forcing it to the right by the hand of the operator thereon without manipulation or release of any stop or feed mechanism. Moreover, the operator need simply return the carriage as far as it will go and then after releasing his pressure and after a slight movement to the left the carriage is held in proper columnar position by the locking dog. The described arrangement in this respect permits of convenient manipulation and rapid work.

It will be understood that the capacity of the machine may be increased or decreased as desired, according to the particular requirements of the accounting work to be performed thereby. The number of rows of keys and trains of associated parts may therefore vary with the class or range of accounting work. The present machine has a considerable range or capacity, but in case the numbers of the cars being printed and listed according to the example hereinbefore referred to should exceed fixe figures, then the machine should have an additional row of keys and associated parts on the right of those already present, or the same result could be accomplished by splitting or dividing the present machine between the sixth and seventh rows of keys instead of its fifth and sixth, counting from the right, provided, of course, the consequent decrease in range or capacity of the left hand division of the machine is immaterial. The adaptation and adjustment of the machine to any particular class or range of work is therefore a comparatively simple matter.

I claim:

1. In an adding machine, the combination with adding mechanism and mechanism adapted to print a plurality of figures at one operation, of a movable paper carriage coöperating with the printing mechanism, and means controlled by such carriage for throwing the adding mechanism of the machine out of action; substantially as described.

2. In an adding machine, the combination with adding mechanism and mechanism adapted to print a plurality of figures at one operation, of a movable paper carriage coöperating with the printing mechanism, and means controlled by the movements of such carriage for throwing the adding mechanism of the machine out of action; substantially as described.

3. In an adding machine, the combination with adding mechanism and mechanism adapted to print a plurality of figures at one operation, of a movable paper carriage coöperating with the printing mechanism, and means controlled by such carriage for throwing the adding mechanism of the machine out of action without interfering with the printing mechanism thereof; substantially as described.

4. In an adding machine, the combination with adding mechanism and mechanism adapted to print a plurality of figures at a single operation, of a laterally movable paper carriage coöperating with the printing mechanism, a device operating to eliminate the function of the adding mechanism of the machine, and means controlling said device and determining whether it shall be operative or inoperative as determined by the particular position of the paper carriage; substantially as described.

5. In an adding machine, the combination with adding mechanism and mechanism adapted to print a plurality of figures at one operation, and with a laterally movable paper carriage, of a device adapted to eliminate the adding function of the machine during the printing of numbers not to be added, and means controlled by the paper carriage for shifting said device into operative and inoperative relation with the machine; substantially as described.

6. In an adding machine, the combination with adding mechanism and mechanism adapted to print a plurality of figures at a single operation, of a laterally movable paper carriage coöperating with the printing mechanism, a device operating to eliminate the function of the adding mechanism of the machine, and means carried by and movable with the paper carriage for controlling said device and determining whether it shall be operative or inoperative according to the particular position of the carriage; substantially as described.

7. In an adding machine, the combination with adding mechanism and mechanism adapted to print a plurality of figures at a single operation, of a laterally movable paper carriage coöperating with the printing mechanism, a device operating to eliminate the function of the adding mechanism of the machine, and adjustable means for controlling said device and determining whether it shall be operative or inoperative at any particular time according to the particular adjustment; substantially as described.

8. In an adding machine, the combination with adding mechanism and mechanism adapted to print a plurality of figures at a single operation, of a laterally movable paper carriage coöperating with the printing mechanism, a device normally operating to eliminate the function of the adding mechanism of the machine, and means adjustably mounted on the paper carriage for controlling said device and determining whether it shall be operative or inoperative at any predetermined position of the paper carriage; substantially as described.

9. In an adding machine, the combination with adding mechanism and mechanism adapted to print a plurality of figures at a single operation, of a laterally movable paper carriage and means controlled thereby for throwing the adding mechanism out of action at any predetermined position of the paper carriage; substantially as described.

10. In an adding machine, the combination of printing and adding mechanism, a laterally movable paper carriage coöperating with the printing mechanism, a device operating to eliminate the function of the adding mechanism of the machine, and an operating arm or finger operatively connected with said device and controlled by the paper carriage in the latter's movements; substantially as described.

11. In an adding machine, the combination of printing and adding mechanism, a laterally movable paper carriage coöperating with the printing mechanism, a device operating to eliminate the function of the adding mechanism of the machine, an operating arm or finger operatively connected with said device and arranged to be actuated by the paper carriage in its movements to thereby render said device operative or inoperative; substantially as described.

12. In an adding machine, the combination of printing and adding mechanism, a laterally movable paper carriage coöperating with the printing mechanism, a device operating to eliminate the function of the adding mechanism of the machine, an operating arm or finger operatively connected with said device, and means on the paper carriage for actuating said finger to thereby render said device operative or inoperative; substantially as described.

13. In an adding machine, the combination of printing and adding mechanism, a laterally movable paper carriage coöperating with the printing mechanism, a device operating to eliminate the function of the adding mechanism of the machine, an operating arm or finger operatively connected with said device, and means adjustably mounted on the paper carriage for actuating the finger and determining whether said device shall be operative or inoperative; substantially as described.

14. In an adding machine, the combination of printing and adding mechanism, a laterally movable paper carriage coöperating with the printing mechanism, a movable device operating to eliminate the function of the adding mechanism of the machine and having an operative and inoperative position, an operating arm or finger operatively connected with said device, and means mounted on the paper carriage and arranged to contact and actuate said finger to determine the particular position of said device; substantially as described.

15. In an adding machine, the combination of printing and adding mechanism, a laterally movable paper carriage coöperating with the printing mechanism, a movable device operating to eliminate the function of the adding mechanism of the machine and having operative and inoperative positions, an operating finger operatively connected with said device, and a plurality of means mounted on the paper carriage and arranged to actuate the finger and thereby render said device operative and inoperative at different positions of the paper carriage; substantially as described.

16. In an adding machine, the combination of printing and adding mechanism, a laterally movable paper carriage coöperating with the printing mechanism, a "total" key and connections controlling the operation of the printing mechanism to print a total, and means controlled by the movements of the paper carriage and coöperating with the "total" key connections to throw the adding mechanism out of action; substantially as described.

17. In an adding machine, the combination of printing and adding mechanism, a laterally movable paper carriage coöperating with the printing mechanism, a "total" key and connections controlling the operation of the printing mechanism to print a total, and means coöperating with the "total" key connections for eliminating the adding function of the machine and adapted to be rendered operative or inoperative at any predetermined position of the paper carriage; substantially as described.

18. In an adding machine, the combination of printing and adding mechanism, a laterally movable paper carriage coöperating with the printing mechanism, a "total" key and connections controlling the operation of the printing mechanism to print a total, a device coöperating with the "total" key connections for eliminating the adding function of the machine, and automatic means controlled by the movements of the paper carriage for rendering said device operative or inoperative according to the particular position of the paper carriage; substantially as described.

19. In an adding machine, the combination of printing and adding mechanism, a laterally movable paper carriage coöperating with the printing mechanism, a "total" key and connections controlling the operation of the printing mechanism to print a total, a device coöperating with the "total" key connections for eliminating the adding function of the machine, and means arranged on the paper carriage for automatically rendering said device operative or inoperative according to the particular position of such carriage; substantially as described.

20. In an adding machine, the combination of priting and adding mechanism, a laterally movable paper carriage coöperating with the printing mechanism, a "total" key and connections controlling the operation of the printing mechanism to print a total, a device coöperating with the "total" key connections for eliminating the adding function of the machine, and means adjustably arranged on the paper carriage for determining whether said device is operative or inoperative according to the particular position of such carriage; substantially as described.

21. In an adding machine, the combination of printing and adding mechanism, a laterally movable paper carriage coöperating with the printing mechanism, a device arranged to eliminate the adding function of such machine, and means for rendering said device inoperative; substantially as described.

22. In an adding machine, the combination of printing and adding mechanism, a laterally movable paper carriage coöperating with the printing mechanism, a device arranged to eliminate the adding function of such machine, and means controlled by the movements of the paper carriage for rendering said device inoperative; substantially as described.

23. In an adding machine, the combination of printing and adding mechanism, a laterally movable paper carriage coöperating with the printing mechanism, a moving part, a device arranged in the path of movement thereof and actuated thereby to eliminate the adding function of the machine, and means for withdrawing said device from such operative position; substantially as described.

24. In an adding machine, the combination of printing and adding mechanism, a laterally movable paper carriage coöperating with the printing mechanism, a moving part, a device adapted to be inserted in the path of movement thereof and actuated thereby to eliminate the adding function of the machine, and means controlled by the movements of the paper carriage for governing said device as to its operative and inoperative position; substantially as described.

25. In an adding machine, the combination of printing and adding mechanism, a laterally movable paper carriage coöperating with the printing mechanism, a moving part, a device adapted to be inserted in the path of movement thereof and actuated thereby to eliminate the adding function of the machine, and means for controlling its operative relation according to any particular predetermined position of the paper carriage; substantially as described.

26. In an adding machine, the combination of printing and adding mechanism, a laterally movable paper carriage coöperating with the printing mechanism, a moving part, a device arranged in the path of movement thereof and actuated thereby to eliminate the adding function of the machine, and means adjustably arranged on the paper carriage for controlling said device as to its operative position; substantially as described.

27. In an adding machine, the combination of printing and adding mechanism, a laterally movable paper carriage coöperating with the printing mechanism, a moving part, a device arranged in the path of movement thereof and actuated thereby to eliminate the adding function of the machine, and means arranged on the paper carriage for rendering said device operative or inoperative according to the particular position of the carriage; substantially as described.

28. In an adding machine, the combination of printing and adding mechanism, a laterally movable paper carriage coöperating with the printing mechanism, a moving part, a device normally arranged in the path of movement thereof and actuated thereby to eliminate the adding function of the machine, and means adjustably mounted on the paper carriage for controlling the position of said device and withdrawing it from said operative relation at a certain predetermined position of the carriage; substantially as described.

29. In an adding machine, the combination of printing and adding mechanism, a laterally movable paper carriage coöperating with the printing mechanism, a moving part, a device movable in or out of the path of movement thereof and actuated thereby to eliminate the adding function of the machine, means for yieldingly holding said device in one of said positions, and means controlled by the paper carriage for moving said device to its other position; substantially as described.

30. In an adding machine, the combination of printing and adding mechanism, a laterally movable paper carriage coöperating with the printing mechanism, a moving part, a device normally arranged in the path of movement thereof and actuated thereby to eliminate the adding function of the machine, a spring for yieldingly holding said device in such normal position, and means controlled by the movements of the paper carriage for withdrawing said device from such operative position against the spring tension; substantially as described.

31. In an adding machine, the combination of printing and adding mechanism, a laterally movable paper carriage coöperating with the printing mechanism, a moving part, a device normally arranged in the path of movement thereof and actuated thereby to eliminate the adding function of the machine, and means for withdrawing said device from such operative relation at a predetermined position of the carriage and retaining the same in such inoperative rela- 32. In an adding machine, the combination of printing and adding mechanism and movable paper carriage thereof, tabulating mechanism therefor, a device adapted to eliminate the adding function of the machine and means adapted to render said device operative or inoperative according to the particular columnar position of the carriage; substantially as described.

33. In an adding machine, the combination with the printing and adding mechanism and movable paper carriage thereof, tabulating mechanism therefor, of a device normally spring pressed into position to eliminate the adding function of the machine, and means adapted to render said device inoperative against the spring tension at a certain columnar position of the carriage; substantially as described.

34. In an adding machine, the combination of printing and adding mechanism, totalizing mechanism controlling the operation of the printing mechanism to print a total, and means coöperating with the totalizing mechanism to eliminate the adding function of the machine; substantially as described.

35. In an adding machine, the combination of printing and adding mechanism, totalizing mechanism controlling the operation of the printing mechanism to print a total, and a lever 1 coöperating with the totalizing mechanism to eliminate the adding function of the machine; substantially as described.

36. In an adding machine, the combination of printing and adding mechanism, totalizing mechanism controlling the operation of the printing mechanism to print a total, and a lever 1 normally in condition to be actuated and coöperating with the totalizing mechanism to eliminate the adding function of the machine; substantially as described.

37. In an adding machine, the combination of printing and adding mechanism, totalizing mechanism controlling the operation of the printing mechanism to print a total, a lever 1 coöperating with the totalizing mechanism to eliminate the adding function of the machine, a moving part and means adapted to be interposed between said lever and said moving part of the machine to move the former and thereby actuate the totalizing mechanism; substantially as described.

38. In an adding machine, the combination of printing and adding mechanism, totalizing mechanism controlling the operation of the printing mechanism to print a total, a lever 1 coöperating with the totalizing mechanism to eliminate the adding function of the machine, a moving part, means adapted to be interposed between said lever and said moving part of the machine to move the former and thereby actuate the totalizing mechanism, and mechanism for controlling said means and arranged to remove it from the said interposed position; substantially as described.

39. In an adding machine, the combination of printing and adding mechanism, totalizing mechanism controlling the operation of the printing mechanism to print a total, a laterally movable paper carriage and platen roller to receive the impressions from the printing mechanism, a lever 1 coöperating with the totalizing mechanism to eliminate the adding function of the machine, a moving part and means controlled by the movements of the paper carriage and adapted to be interposed between said lever and said moving part of the machine to move the former and thereby actuate the totalizing mechanism; substantially as described.

40. In an adding machine, the combination of printing and adding mechanism, totalizing mechanism controlling the operation of the printing mechanism to print a total, a laterally movable paper carriage and platen roller to receive the impressions from the printing mechanism, a lever 1 coöperating with the totalizing mechanism to eliminate the adding function of the machine, a moving part and means adapted to be interposed between said lever and said moving part of the machine to move the former and thereby actuate the totalizing mechanism, said means being controlled by the movements of the paper carriage; substantially as described.

41. In an adding machine, the combination of printing and adding mechanism, totalizing mechanism controlling the operation of the printing mechanism to print a total, a lever 1 coöperating with the totalizing mechanism to eliminate the adding function of the machine, a movable part and a movable stud adapted to be interposed between the lever and said movable part of the machine to move the former and thereby actuate the "total" key connections; substantially as described.

42. In an adding machine, the combination of printing and adding mechanism, totalizing mechanism controlling the operation of the printing mechanism to print a total, a lever 1 coöperating with the totalizing mechanism to eliminate the adding function of the machine, a movable part, a vertically movable arm having a stud adapted to be interposed between the lever and said movable part of the machine to move the former and thereby actuate the totalizing mechanism; substantially as described.

43. In an adding machine, the combination of printing and adding mechanism, totalizing mechanism controlling the operation of the printing mechanism to print a total, a lever 1 coöperating with the totalizing mechanism to eliminate the adding function of the machine and provided with a bearing surface 1ª, a movable part, and a movable stud adapted to be interposed between said surface 1ª of the lever and said movable part of the machine to form such lever 1 and thereby actuate the totalizing mechanism; substantially as described.

44. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4 having a depending arm provided with a stud which, in one position, is interposed between the lever 1 and said movable part of the machine; substantially as described.

45. In an adding machine, the combination of printing and adding mechanism, totalizing mechanism controlling the operation of the printing mechanism to print a total, a lever 1 coöperating with the totalizing mechanism to eliminate the adding function of the machine, a movable block having a limit of movement in close proximity to such lever, and a device arranged to be interposed between such lever and block to transmit the motion of the latter to the former and thereby actuate the totalizing mechanism; substantially as described.

46. In an adding machine, the combination of printing and adding mechanism, totalizing mechanism controlling the operation of the printing mechanism to print a total, a lever 1 coöperating with the totalizing mechanism to eliminate the adding function of the machine, a movable block having a limit of movement in close proximity to such lever, and a spring-pressed device adapted to be interposed between such lever and block to transmit the motion of the latter to the former and thereby actuate the totalizing mechanism; substantially as described.

47. In an adding machine, the combination of printing and adding mechanism, totalizing mechanism controlling the operation of the printing mechanism to print a total, a lever 1 coöperating with the totalizing mechanism to eliminate the adding function of the machine, a movable block having a limit of movement in close proximity to such lever, and a spring pressed vertically movable depending arm provided with a stud arranged to be interposed between such lever and block to transmit the motion of the latter to the former and thereby actuate the totalizing mechanism; substantially as described.

48. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4, and a depending arm 5 pivoted to one end of the lever 4 and provided with a stud 6 which is arranged to be interposed between the lever 1 and said movable part of the machine to actuate such lever 1; substantially as described.

49. In an adding machine, the combination of printing and adding mechanism, totalizing mechanism controlling the operation of the printing mechanism to print a total, a lever 1 coöperating with the "total" key connections to eliminate the adding function of the machine, a movable part, a second lever 4, a depending arm 5 pivoted to the lever 4 and yieldingly held in a downward position, a stud 6 adapted, in a certain position of its arm, to be interposed between said lever 1 and said movable part of the machine, and means for removing the arm and stud from such interference; substantially as described.

50. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4, a depending arm 5 pivoted to the lever 4 and normally spring-pressed downwardly, a stud 6 arranged on such arm and adapted to be interposed between said lever and said movable part of the machine, and means for operating the lever 4 and the arm 5 against the spring tension; substantially as described.

51. In an adding machine, the combination of printing and adding mechanism, totalizing mechanism controlling the operation of the printing mechanism to print a total, a lever 1 coöperating with the total ing mechanism to eliminate the adding function of the machine, a movable part, a section of the machine, a movable part, a second lever 4, and a depending arm 5 connected with lever 4 and provided with a stud 6 projecting laterally in the plane of movement of lever 1 and adapted to be interposed between such latter lever and said movable part of the machine; substantially as described.

52. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4 normally depressed with a yielding pressure, an arm 5 connected with lever 4 and provided with a laterally projecting stud normally interposed between the lever 4 and said movable part of the machine; substantially as described.

53. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4, a depending arm 5 pivoted to the forward end of such lever 4, means for limiting the rearward movement of the arm 5 with respect to lever 4 and a laterally projecting stud arranged on the arm 5 and adapted to be interposed between such lever 1 and said movable part of the machine; substantially as described.

54. In an adding machine, the combination of printing and adding mechanism, totalizing mechanism controlling the operation of the printing mechanism to print a total, a lever 1 coöperating with the totalizing mechanism to eliminate the adding function of the machine, a movable part, a second lever 4 pivoted at its rear end and extending forwardly, a stop pin on such forward end of the latter lever, a depending arm 5 pivoted to the forward end of the lever 4 and limited in its forward movement by such stop pin, a laterally projecting stud arranged on the arm 5 and adapted to be interposed between such lever 1 and said movable part of the machine, and means for operating the lever 4; substantially as described.

55. In an adding machine, the combination of printing and adding mechanism, totalizing mechanism controlling the operation of the printing mechanism to print a total, a lever 1 coöperating with the totalizing mechanism to eliminate the adding function of the machine and provided with a bearing surface 1ª on one edge, a second lever 4 extending forwardly of the machine, an arm 5 depending from the forward end of the lever 4 and having a stud arranged at the lower end and adapted to be positioned in proximity to said surface 1ª; substantially as described.

56. In an adding machine, the combination with the printing and adding mechanism and the bell crank 227 of the "total" key connections which control the printing mechanism to print a total, of a lever 1 operatively connected with said bell crank, and means for operating said lever, to eliminate the adding function of the machine; substantially as described.

57. In an adding machine, the combination with the printing and adding mechanism and the bell crank 227 of the "total" key connections which control the printing mechanism to print a total, of a lever 1 pivoted at its lower end and at its upper end operatively connected with said bell crank, and means for rocking said lever to actuate the "total" key connections and eliminate the adding function of the machine; substantially as described.

58. In an adding machine, the combination, with the printing and adding mechanism and the bell crank 227 and link 226 of the "total" key connections which control the printing mechanism to print a total, of a lever 1 connected to said link, and means for rocking said lever to actuate the "total" key connections and eliminate the adding function of the machine; substantially as described.

59. In an adding machine, the combination, with the printing and adding mechanism, the arm 914 for controlling the swinging of the adding pinion frame, the lever 913 connected with arm 914, and rocking lever 813 arranged to actuate the lever 913, of means for preventing the operation of the lever 913 after its operation thereby to throw out said pinion frame, whereby the pinions are kept removed from operative position; substantially as described.

60. In an adding machine, the combination, with the printing and adding mechanism, the arm 914 for controlling the swinging of the adding pinion frame, the lever 913 connected with arm 914, and rocking lever 813 having a wiper-block arranged to actuate the lever and rock it and the arm 914 forwardly and rearwardly and means for operating the arm 914, whereby the adding mechanism of the machine will be thrown out and kept out of action; substantially as described.

61. In an adding machine, the combination, with the printing and adding mechanism, the arm 914 for controlling the swinging of the adding pinion frame, the lever 913 connected with arm 914, and rocking lever 813 arranged to rock the lever 913 forwardly and rearwardly, of a device for operating the arm 914 to swing the pinion frame and thereby throw the adding mechanism out of action, and means for rendering said device operative or inoperative; substantially as described.

62. In an adding machine, the combination, with the printing and adding mechanism and adding pinions thereof, the devices for controlling the movements of such pinions into and out of operative relation, and the rocking lever 813 for operating said devices, of a lever operatively connected with such devices and adapted, under certain conditions, to be operated by the lever 813 to prevent such latter lever from restoring the pinions to operative relation; substantially as described.

63. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and normally adapted to be rocked by the lever 813 to prevent such latter lever from restoring the pinions to operative relation; substantially as described.

64. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, and means adapted to be interposed between said levers to cause actuation of the lever 1 by the lever 813 at the extreme stroke of the latter and thereby prevent restoration of the pinions to operative relation; substantially as described.

65. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a stud 6 adapted to be interposed between said levers to cause actuation of lever 1 by the lever 813 at the extreme stroke of the latter and thereby prevent restoration of the pinions to operative relation, and means for inserting and removing said stud from such interfering position; substantially as described.

66. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a stud 6 normally positioned between said levers to cause actuation of lever 1 by the lever 813 at the extreme stroke of the latter and thereby prevent restoration of the pinions to operative relation, and means for removing said stud from such interfering position; substantially as described.

67. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a stud 6 normally held, with a yielding pressure, between said levers to cause actuation of lever 1 by the lever 813 at the extreme stroke of the latter and thereby prevent restoration of the pinions to operative relation, and means for removing said stud from such interfering position; substantially as described.

68. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a block on said lever 813, and means adapted to be interposed between said block and lever 1 to cause actuation of such lever at the extreme stroke of the lever 813, thereby preventing restoration of the pinions to operative relation; substantially as described.

69. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a block on said lever 813, and a movable stud adapted to be interposed between said block and lever 1 to cause actuation of such latter lever during the rocking movements of the lever 813, thereby preventing restoration of the pinions to operative relation; substantially as described.

70. In an adding machine, the combination, with the printing and adding mechanism and adding pinions thereof, the devices for controlling the movements of such pinions into and out of operative relation, and the rocking lever 813 for operating said devices, of a rocking lever 1 operatively connected with such devices and arranged substantially in the path of movement of the lever 813 but positioned beyond the limit of movement of the latter, a block on said lever 813, a lever 4 extending forwardly in the machine, a depending arm 5 pivoted on the forward end of such lever 4, and a stud 6 adapted to be interposed between said block and lever 1 to cause actuation of such latter lever during the rocking movements of the lever 813, thereby preventing restoration of the pinions to operative relation; substantially as described.

71. In an adding machine, the combination, with the printing and adding mechanism, the laterally movable paper carriage, and the "total" key connections, of a lever 1 operatively connected with the "total" key connections, a movable part and a movable stud 6 whose movements are controlled by the paper carriage and adapted to be interposed between said lever and said movable part of the machine; substantially as described.

72. In an adding machine, the combination, with the printing and adding mechanism, the laterally movable paper carriage, and the "total" key connections, of a lever 1 operatively connected with the "total" key connections, a movable part, a lever 4 whose movements are controlled by the paper carriage, an arm 5 depending from such lever 4, and a stud arranged on said arm and interposed between said lever 1 and said movable part of the machine; substantially as described.

73. In an adding machine, the combination, with the printing and adding mechanism, the laterally movable paper carriage, and the "total" key connections, of a lever 1 operatively connected with the "total" key connections, a movable part, a lever 4, means controlled by the movements of the paper carriage for operating the lever 4, and a stud 6 operatively connected with the latter lever and arranged to be interposed between said lever 1 and said movable part of the machine; substantially as described.

74. In an adding machine, the combination, with the printing and adding mechanism, the laterally movable paper carriage, and the "total" key connections, of a lever 1 operatively connected with the "total" key connections, a movable part, a lever 4, means on the carriage for operating the latter lever, and a stud 6 operatively connected with the latter lever and arranged to be interposed between said lever 1 and said movable part of the machine; substantially as described.

75. In an adding machine, the combination, with the printing and adding mechanism, the laterally movable paper carriage, and the "total" key connections, of a lever 1 operatively connected with the "total" key connections, a movable part, a lever 4, a stud 6 operatively connected with the latter lever and normally interposed between the lever 1 and said movable part of the machine, and means on the paper carriage for removing said stud from interfering to non-interfering position at a certain position of such carriage; substantially as described.

76. In an adding machine, the combination, with the printing and adding mechanism, the laterally movable paper carriage, and the "total" key connections, of a lever 1 operatively connected with the "total" key connections, a movable part, a lever 4, a stud 6 operatively connected with the latter lever and normally interposed between the lever 1 and said movable part of the machine, a controlling lever operatively connected with the lever 4, and controlled by the paper carriage for actuating such lever 4 at certain positions of the carriage and thereby moving the stud from said interfering to non-interfering position; substantially as described.

77. In an adding machine, the combination, with the printing and adding mechanism, the laterally movable paper carriage, and the "total" key connections, of a lever 1 operatively connected with the "total" key connections, a movable part, a lever 4, a stud 6 operatively connected with the latter lever and normally interposed between the lever 1 and said movable part of the machine, a controlling lever operatively connected with the lever 4, and means on the paper carriage for actuating such lever 4 at certain positions of the carriage and thereby removing the stud from said interfering to non-interfering position; substantially as described.

78. In an adding machine, the combination, with the printing and adding mechanism, the laterally movable paper carriage, and the "total" key connections, of a lever 1 operatively connected with the "total" key connections, a movable part, a lever 4, a stud 6 operatively connected with the latter lever and arranged to be interposed between the lever 1 and said movable part of the machine, said stud being arranged to be moved from an interfering to a non-interfering position, a controlling lever operatively connected with the lever 4, and extending adjacent the paper carriage, and means on the paper carriage for contacting and operating said controlling lever at a certain position of the carriage and thereby operating the lever 4 to move the stud from one position to another; substantially as described.

79. In an adding machine, the combination, with the printing and adding mechanism, the laterally movable paper carriage, and the "total" key connections, of a lever 1 operatively connected with the "total" key connections, a moving part, a lever 4, a depending arm 5 pivoted to the front end of such lever, a stud 6 located at the lower end of such arm and adapted to be interposed between the lever 1 and said moving part of the machine to actuate such latter lever and thereby throw the adding mechanism out of action, and a controlling lever connected with lever 4 and actuated by the paper carriage in a certain position thereof; substantially as described.

80. In an adding machine, the combination, with the printing and adding mechanism, the laterally movable paper carriage, and the "total" key connections, of a lever 1 operatively connected with the "total" key connections, a movable part, a lever 4, a depending arm 5 pivoted to the front end of such lever, a stud 6 located at the lower end of such arm and adapted to be interposed between the lever 1 and said moving part of the machine to actuate such latter lever and thereby throw the adding mechanism out of action, said stud being movable from an interfering to a non-interfering position, a controlling lever connected with lever 4, and means on the paper carriage for operating the controlling lever and thereby operating the lever 4 to remove said stud from one position to another; substantially as described.

81. In an adding machine, the combination of printing and adding mechanism, a "total" key and connections controlling the operation of the printing mechanism to print a total, a lock for locking the "total" key, and mechanism for eliminating the adding function of the machine and adapted, when actuated, to prevent said means from locking the "total" key; substantially as described.

82. In an adding machine, the combination of printing and adding mechanism, a "total" key and connections controlling the operation of the printing mechanism to print a total, a lock for locking the "total" key, a device coöperating with the "total" key connections to throw the adding mechanism of the machine out of operation, and a locking lever coöperating with said device and adapted to prevent operation of said "total" key lock; substantially as described.

83. In an adding machine, the combination of printing and adding mechanism, a "total" key and connections controlling the operation of the printing mechanism to print a total, a lock for locking the "total" key against operation, a lever 1 coöperating with the "total" key connections adapted, when operated, to eliminate the adding function of the machine, a lever 4 controlling the movements of said lever 1, and a locking lever actuated by lever 4 for preventing the operation of said "total" key lock; substantially as described.

84. In an adding machine, the combination of printing and adding mechanism, a "total" key and connections controlling the operation of the printing mechanism to print a total, a lock for locking the "total" key against operation, a lever 1 coöperating with the "total" key connections adapted, when operated, to eliminate the adding function of the machine, a lever 4 controlling the movements of said lever 1, a locking lever for preventing the operation of the "total" key lock, and a link for connecting said locking lever with the controlling lever 4; substantially as described.

85. In an adding machine, the combination of printing and adding mechanism, a "total" key and connections controlling the operation of the printing mechanism to print a total, a lock for locking the "total" key against operation, a lever 1 coöperating with the "total" key connections adapted, when operated, to eliminate the adding function of the machine, a lever 4 controlling the movements of said lever 1, and a locking lever operatively connected with the lever 4 and having a hook arranged to engage the "total" key lock and prevent its operation; substantially as described.

86. In an adding machine, the combination of printing and adding mechanism, a "total" key and connections controlling the operation of the printing mechanism, a pivoted lever 828 arranged to lock the "total" key against operation, and a device coöperating with the "total" key connection, for throwing the adding mechanism out of operation, said device being operatively connected with the lever 828 and adapted, when operated, to prevent its operation; substantially as described.

87. In an adding machine, the combination of printing and adding mechanism, a "total" key and connections controlling the operation of the printing mechanism, a moving part, a pivoted lever 828 arranged to lock the "total" key against operation, and normally held out of locking engagement by said moving part of the machine, and a device coöperating with the "total" key connections for throwing the adding mechanism out of operation, said device coöperating with lever 828 and adapted, when operated, to restrain the latter from locking action; substantially as described.

88. In an adding machine, the combination of printing and adding mechanism, a "total" key and connections controlling the operation of the printing mechanism, a moving part, a pivoted lever 828 arranged to lock the "total" key against operation, and normally held out of locking engagement by said moving part of the machine, a lever 1 coöperating with the "total" key connections and adapted, when operated, to throw the adding mechanism out of operation, a lever 4 controlling the movements of said lever 1, and a locking lever 8 operatively connected with levers 4 and 828 and arranged, when operated, to prevent the latter lever from locking the "total" key; substantially as described.

89. In an adding machine, the combination of printing and adding mechanism, a "total" key and connections controlling the operation of the printing mechanism, a moving part, a pivoted lever 828 arranged to lock the "total" key against operation, and normally held out of locking engagement by said moving part of the machine, a lever 1 coöperating with the "total" key connections and adapted, when operated, to throw the adding mechanism out of operation, a lever 4 controlling the movements of said lever 1, a stud on lever 828, and a locking lever 8 operatively connected with lever 4 and arranged, when operated, to engage the stud on said lever 828 to prevent the latter from locking the "total" key; substantially as described.

90. In an adding machine, the combination of printing and adding mechanism, a "total" key and connections controlling the operation of the printing mechanism, a moving part, a pivoted lever 828 arranged to lock the "total" key against operation, and normally held out of locking engagement by said moving part of the machine, a lever 1 coöperating with the "total" key connections and adapted, when operated, to throw the adding mechanism out of operation, a lever 4 controlling the movements of said lever 1, a stud on lever 828, and a locking lever 8 operatively connected with lever 4 and provided with a hook at one end to engage said stud when the lever 8 is operated, thereby preventing the lever 828 from locking the "total" key; substantially as described.

91. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever connected with said device and actuated by the paper carriage; substantially as described.

92. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever connected with said device, and a projection on the carriage, in the path of which projection the controlling lever extends; substantially as described.

93. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever connected with said device, and a plurality of projections on said carriage for operating the controlling lever in different positions of the carriage; substantially as described.

94. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever connected with said device, and an adjustable projection on the carriage for operating the controlling lever; substantially as described.

95. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from such operative relation comprising a controlling lever connected with said device, and a plurality of adjustable projections on the carriage for operating the controlling lever; substantially as described.

96. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever connected with said device, and a projection adjustable longitudinally of the carriage and arranged to contact and operate the controlling lever in any particular position of the carriage; substantially as described.

97. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever or finger connected with said device and extending into proximity to the carriage, and a cam arranged on the carriage and adapted to operate the controlling lever or finger; substantially as described.

98. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever or finger connected with said device and extending into proximity to the carriage, and a cam adjustable longitudinally of the carriage and adapted to operate the controlling lever or finger; substantially as described.

99. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever or finger connected with said device and extending into proximity to the carriage, and a plurality of cams arranged on the carriage and adapted to operate the controlling lever or finger; substantially as described.

100. In an adding machine, the combination with printing and adding mechanism a moving part and a laterally movable paper carriage, of a device adapted to be interposed in the path of said moving part of the machine and to be actuated thereby to throw the adding mechanism out of action, and means for controlling the movements of said device from operative to inoperative position comprising a controlling lever or finger connected with said device and extending into proximity to the carriage and a plurality of cams longitudinally adjustable on the carriage and adapted to operate the controlling lever or finger at different positions of the carriage; substantially as described.

101. In an adding machine, the combination of printing and adding mechanism, a laterally movable paper carriage, a device to eliminate the adding function of the machine, and a controlling lever operatively connected with such device and actuated by the movements of the paper carriage; substantially as described.

102. In an adding machine, the combination of printing and adding mechanism, a laterally movable paper carriage, a device to eliminate the adding function of the machine and adapted to be moved from operative to inoperative position, a controlling lever operatively connected with such device, and a cam on said carriage to contact and operate the controlling lever and thereby move said device from one position to another; substantially as described.

103. In an adding machine, the combination of printing and adding mechanism, a laterally movable paper carriage, a device to eliminate the adding function of the machine, a controlling lever operatively connected with such device, and a cam mounted on and adjustable longitudinally of the carriage and arranged to operate the controlling lever at any predetermined position of the carriage; substantially as described.

104. In an adding machine, the combination of printing and adding mechanism, a laterally movable paper carriage, a device to eliminate the adding function of the machine, a controlling lever operatively connected with such device, and a substantially triangular cam on said carriage to contact and operate the controlling lever; substantially as described.

105. In an adding machine, the combination of printing and adding mechanism, a laterally movable paper carriage, a device to eliminate the adding function of the machine, a controlling lever operatively connected with such device, said carriage being provided with a longitudinal slot, and a cam adjustably secured in said slot and coöperating with the controlling lever to operate the same and thereby actuate said device at a certain predetermined position of the carriage; substantially as described.

106. In an adding machine, the combination of printing and adding mechanism, a laterally movable paper carriage, a device to eliminate the adding function of the machine, a controlling lever operatively connected with such device, a slotted plate secured to such carriage, and a cam adjustably secured in the slot of the plate and coöperating with the controlling lever to operate the same at a certain predetermined position of the carriage; substantially as described.

107. In an adding machine, the combination of printing and adding mechanism, a laterally movable paper carriage, a device to eliminate the adding function of the machine, a controlling lever operatively connected with such device, a slotted plate secured to such carriage, and a plurality of depending cams adjustably secured in the slot of the plate and coöperating with the controlling lever to operate the same at certain positions of the carriage according to the 108. In an adding machine, the combination of printing and adding mechanism, a laterally movable paper carriage, a device to eliminate the adding function of the machine, a depending cam on the paper carriage, and a controlling lever operatively connected with such device and extended beneath and in proximity to the paper carriage and in the path of movement of said cam, whereby when the controlling lever is depressed by the cam said device will be actuated; substantially as described.

109. In an adding machine, the combination of printing and adding mechanism, a laterally movable paper carriage, a device to eliminate the adding function of the machine, a depending cam on the paper carriage, and a controlling lever operatively connected with such device and adapted to bear against the under side of the paper carriage in the path of movement of such cam, whereby when the controlling lever is depressed by the cam said device will be operated; substantially as described.

110. In an adding machine, the combination of printing and adding mechanism, a laterally movable paper carriage, a device to eliminate the adding function of the machine, a slotted plate secured to the paper carriage, a depending cam adjustably secured in the slot of such plate, and a controlling lever operatively connected with such device and arranged in the path of movement of the cam but adapted to be depressed thereby to actuate said device; substantially as described.

111. In an adding machine, the combination of printing and adding mechanism, a laterally movable paper carriage, a device to eliminate the adding function of the machine, said paper carriage having a downward extension provided with a slot, a depending cam adjustably secured in such slot, and a controlling lever operatively connected with said device and arranged in the path of movement of the cam but adapted to be depressed thereby to actuate said device; substantially as described.

112. In an adding machine, the combination of printing and adding mechanism, a laterally movable paper carriage, a device to eliminate the adding function of the machine, a slotted plate secured to the paper carriage, a depending cam adjustably secured in such slot, and a controlling lever operatively connected with said device and adapted to bear against the under edge of the plate and to be depressed by the cam to actuate said device; substantially as described.

113. In an adding machine, the combination with adding mechanism and mechanism adapted to print a plurality of figures at a single operation, of a laterally movable paper carriage, mechanism adapted to feed the carriage to different columnar positions, and means for actuating said carriage feed mechanism with provisions for adjustment to cause the feed to take place when the carriage is at one or another lateral position.

114. In an adding machine, the combination with adding mechanism and mechanism adapted to print a plurality of figures at a single operation, of a laterally movable paper carriage, mechanism adapted to advance the carriage to different columnar positions, and means for actuating said carriage feed mechanism and dependent for its operation upon the particular position of the carriage; substantially as described.

115. In an adding machine, the combination of printing and adding mechanism, a paper carriage movable laterally and coöperating with the printing mechanism, a tabulating bar, a locking dog coöperating with said bar and adapted to engage the same to hold the carriage at different columnar positions, and means for actuating said dog in certain predetermined positions of the carriage; substantially as described.

116. In an adding machine, the combination of printing and adding mechanism, a paper carriage movable laterally and coöperating with the printing mechanism, a tabulating bar, a locking dog arranged on the carriage and adapted to engage the bar at different positions, and means for actuating said dog in certain predetermined positions of the carriage; substantially as described.

117. In an adding machine, the combination of printing and adding mechanism, a paper carriage movable laterally and coöperating with the printing mechanism, a tabulating bar provided with a series of notches, a rock shaft mounted on the carriage, a locking dog arranged on the rock shaft and held into engagement with any one of the notches with a yielding pressure, and means for actuating said rock shaft and thereby releasing the dog in certain predetermined positions of the carriage; substantially as described.

118. In an adding machine, the combination of printing and adding mechanism, a paper carriage movable laterally and coöperating with the printing mechanism, a tabulating bar provided with a series of notches, a rock shaft mounted on the carriage, a locking dog arranged on the rock shaft and held into engagement with any one of the notches with a yielding pressure, and a tripping arm mounted on the rock shaft and arranged to be actuated in a predetermined position of the carriage; substantially as described.

119. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, and a tripping arm mounted on and adjustable longitudinally of the rock shaft and arranged to be actuated to rock the shaft and release the dog in a predetermined position of the carriage; substantially as described.

120. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, and a plurality of tripping arms adjustably mounted on the rock shaft and arranged to be actuated to rock the shaft and release the dog in a predetermined position of the carriage; substantially as described.

121. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, and a tripping arm mounted on the rock shaft with an adjustment longitudinal and axial thereof and arranged to be actuated to rock the shaft and release the dog in a predetermined position of the carriage; substantially as described.

122. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a tripping arm mounted on the rock shaft, and an operating arm arranged to actuate the tripping arm to thereby release the dog; substantially as described.

123. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a tripping arm mounted on the rock shaft, an operating arm, a wipe block arranged on the operating arm and adapted to actuate the tripping arm to rock the shaft and release the dog; substantially as described.

124. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a tripping arm mounted on the rock shaft, an operating arm, a wipe block mounted on the outer end of the operating arm and arranged to pass by the tripping arm on one stroke and to actuate the same on its return stroke; substantially as described.

125. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a tripping arm mounted on the rock shaft and having a depending foot, an operating arm and a wipe block pivoted on the operating arm and arranged to contact and actuate the foot of the tripping arm to thereby rock the shaft and release the dog; substantially as described.

126. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, an operating arm, a wipe block pivoted on the operating arm, and a plurality of tripping arms mounted on the rock shaft and adapted to be operated by the operating arm; substantially as described.

127. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a plurality of tripping arms mounted on the rock shaft to actuate the latter when moved, an operating arm, and a wipe block pivoted on the outer end of the operating arm and adapted to operate the particular arm presented to it; substantially as described.

128. In an adding machine, the combination of printing and adding mechanism, a paper carriage movable laterally and cooperating with the printing mechanism, a tabulating bar provided with a series of notches, a rock shaft mounted on the carriage, a locking dog arranged on the rock shaft and held into engagement with any one of the notches with a yielding pressure, a plurality of tripping arms mounted on the rock shaft and adjustable longitudinally thereof, an operating arm adapted to be rocked and a wipe block pivoted at the outer end of the operating arm and adapted to operate any one of the tripping arms according to its adjustment and the particular position of the carriage; substantially as described.

129. In an adding machine, the combination of printing and adding mechanism, a paper carriage movable laterally and cooperating with the printing mechanism, a tabulating bar provided with a series of notches and also provided with a stop pin, a rock shaft on the carriage, a locking dog arranged on the rock shaft and coöperating with said bar and adapted to engage any one of the notches according to the particular position of the carriage, means for actuating and releasing the dog in certain predetermined positions of the carriage, and a stop arm mounted on the rock shaft and coöperating with the stop pin; substantially as described.

130. In an adding machine, the combination of printing and adding mechanism, a paper carriage movable laterally and cooperating with the printing mechanism, a tabulating bar provided with a series of notches and also provided with a stop pin, a rock shaft on the carriage, a locking dog arranged on the rock shaft and coöperating with said bar and adapted to engage any one of the notches according to the particular position of the carriage, means for actuating and releasing the dog in certain predetermined positions of the carriage, and a stop arm mounted on and adjustable longitudinally of the shaft and coöperating with the stop pin; substantially as described.

131. In an adding machine, the combination of printing and adding mechanism, a paper carriage movable laterally and cooperating with the printing mechanism, a tabulating bar provided with a series of notches and also provided with a stop pin, a rock shaft on the carriage, a locking dog arranged on the rock shaft and coöperating with said bar and adapted to engage any one of the notches according to the particular position of the carriage, means for actuating and releasing the dog in certain predetermined positions of the carriage, a knob at the end of the rock shaft for releasing the locking dog by hand, and a stop arm mounted on the rock shaft and coöperating with the stop pin; substantially as described.

132. In an adding machine, the combination of printing and adding mechanism, a paper carriage movable laterally and coöperating with the printing mechanism, a tabulating bar provided with a series of notches, a rock shaft on the carriage, a locking dog arranged on the rock shaft and coöperating with said bar whose edge, against which the dog bears, is inclined from one notch to the other, and means for actuating and releasing the dog in certain positions of the carriage; substantially as described.

133. In an adding machine, the combination of printing and adding mechanism, a paper carriage movable laterally and coöperating with the printing mechanism, a tabulating bar provided with a series of notches, a rock shaft arranged on the carriage and normally spring-pressed, a locking dog arranged on the rock shaft and normally held into engagement with one of the notches of the bar, and means for actuating and releasing the dog in certain positions of the carriage; substantially as described.

134. In an adding machine, the combination with adding mechanism and mechanism adapted to print a plurality of figures at a single operation, of a movable paper carriage, and means dependent for its operation upon the particular position of the carriage for feeding the carriage step by step to different columnar positions and permitting such carriage to be shifted back by a single stroke; substantially as described.

135. In an adding machine, the combination with adding mechanism and mechanism adapted to print a plurality of figures at a single operation, of a movable paper carriage, and means for feeding the carriage step by step to different columnar positions and permitting such carriage to be shifted back by a single stroke, said means dependent for operation upon the particular position of the carriage; substantially as described.

136. In an adding machine, the combination of printing and adding mechanism, a paper carriage movable laterally and coöperating with the printing mechanism, a tabulating bar, an edge of said bar being provided with a series of notches and inclined between such notches to form shoulders, a rock shaft on the carriage, a locking dog mounted on the rock shaft and arranged to coöperate with said bar, and means for preventing the dog from engaging the notches but permitting the same to engage the shoulders; substantially as described.

137. In an adding machine, the combination of printing and adding mechanism, a paper carriage movable laterally and coöperating with the printing mechanism, a supporting or track frame for the carriage, a tabulating bar, an edge of said bar being provided with a series of notches and inclined between such notches to form shoulders, a rock shaft on the carriage, a locking dog mounted on the rock shaft and arranged to coöperate with said bar, and means mounted on and coöperating with the rock shaft for preventing the dog from engaging the notches but permitting the same to engage the shoulders of the bar; substantially as described.

138. In an adding machine, the combination of printing and adding mechanism, a paper carriage movable laterally and coöperating with the printing mechanism, a supporting or track frame for the carriage, a tabulating bar, an edge of said bar being provided with a series of notches and inclined between such notches to form shoulders, a rock shaft on the carriage, a locking dog mounted on the rock shaft and arranged to coöperate with said bar, and an arm arranged on the rock shaft and adapted to prevent the dog from engaging the notches but permitting the same to engage the shoulders of the bar; substantially as described.

139. In an adding machine, the combination of printing and adding mechanism, a paper carriage movable laterally and coöperating with the printing mechanism, a supporting or track frame for the carriage, a tabulating bar, an edge of said bar being provided with a series of notches and inclined between such notches to form shoulders, a rock shaft on the carriage, a locking dog mounted on the rock shaft and arranged to coöperate with said bar, and an adjustable arm arranged on the rock shaft and adapted to contact the carriage frame to hold the dog from engagement with the notches without preventing engagement with the shoulders of the bar; substantially as described.

140. In an adding machine, the combination of printing and adding mechanism, a laterally movable paper carriage coöperating with the printing mechanism, a paper roller or platen on the carriage, paper-feed mechanism for said platen for feeding the paper vertically, and means for actuating said paper feed mechanism rendered operative at one or another position of the carriage according to adjustment; substantially as described.

141. In an adding machine, the combination of printing and adding mechanism, a laterally movable paper carriage coöperating with the printing mechanism, a paper roller or platen on the carriage, paper-feed mechanism for said platen for feeding the paper vertically, and means for actuating said paper feed mechanism comprising, in connection with an actuating lever, a feed lever operatively connected with the actuating lever and a feed arm operated by the feed lever and operatively connected with the paper feed mechanism with provisions for adjustment to predetermine the particular lateral position of the carriage at which the feed mechanism shall become operative; substantially as described.

142. In an adding machine, the combination of printing and adding mechanism, a laterally movable paper carriage coöperating with the printing mechanism, a paper roller or platen on the carriage, paper-feed mechanism for said platen for feeding the paper vertically, and means for actuating said paper-feed mechanism comprising, in connection with an actuating lever, a feed lever operatively connected with the actuating lever and a feed arm mounted on and adjustable longitudinally of the carriage and operated by the feed lever, said feed arm being operatively connected with the paper feed mechanism; substantially as described.

143. In an adding machine, the combination of printing and adding mechanism, a paper carriage movable laterally and coöperating with the printing mechanism, a paper roller or platen on the carriage, paper-feed mechanism for said platen for feeding the paper vertically, and means for actuating said paper-feed mechanism comprising, in connection with an actuating lever, a feed lever operatively connected with the actuating lever and a plurality of feed arms operated by the feed lever and operatively connected with the paper-feed mechanism; substantially as described.

144. In an adding machine, the combination of printing and adding mechanism, a paper carriage movable laterally and coöperating with the printing mechanism, a paper roller or platen on the carriage, a paper-feed mechanism for said platen for feeding the paper vertically, and means for actuating said paper-feed mechanism comprising, in connection with an actuating lever, a feed lever operatively connected with the actuating lever and a plurality of feed arms operated by the feed lever and independently adjustable longitudinally of the paper carriage, said feed arms being operatively connected with the paper-feed mechanism; substantially as described.

145. In an adding machine, the combination of printing and adding mechanism, a paper carriage movable laterally and coöperating with the printing mechanism, a paper roller or platen on the carriage, paper-feed mechanism for said platen for feeding the paper vertically, and means for actuating said paper-feed mechanism comprising, in connection with an actuating lever, a feed lever operatively connected with the actuating lever, a rock shaft operatively connected with the paper feed mechanism, and a feed arm mounted on and adjustable longitudinally of the rock shaft, said arm being arranged to be actuated by the feed lever; substantially as described.

146. In an adding machine, the combination of printing and adding mechanism, paper carriage movable laterally and coöperating with the printing mechanism, a paper roller or platen on the carriage, paper-feed mechanism for said platen for feeding the paper vertically, and means for actuating said paper-feed mechanism comprising, in connection with an actuating lever, a feed lever operatively connected with the actuating lever, a rock shaft operatively connected with the paper feed mechanism, and a feed arm mounted on the shaft and having a laterally projecting stud arranged to be contracted by the feed lever with provisions for presenting the stud thereto, substantially as described.

147. In an adding machine, the combination of printing and adding mechanism, a paper carriage movable laterally and coöperating with the printing mechanism, a paper roller or platen on the carriage, paper-feed mechanism for said platen for feeding the paper vertically, tabulating mechanism associated with said carriage, and a bell crank, one arm of which actuates the tabulating mechanism and the other arm the paper feed mechanism; substantially as described.

148. In an adding machine, the combination of printing and adding mechanism, a paper carriage movable laterally and coöperating with the printing mechanism, a paper roller or platen on the carriage, paper-feed mechanism for said platen for feeding the paper vertically, tabulating mechanism associated with said carriage, said latter mechanism and the paper feed mechanism being arranged to be operated at predetermined positions of the carriage, and a bell crank operated by the operations of the adding machine, one arm of such bell crank actuating the tabulating mechanism and the other arm the paper feed mechanism; substantially as described.

149. In an adding machine, the combination with adding and printing mechanism and a laterally movable paper carriage, of a device controlled by the movements of the carriage for eliminating the adding function of the machine at predetermined times, paper feed mechanism and mechanism for feeding the carriage longitudinally, both latter mechanisms being actuated according to the particular predetermined position of the carriage; substantially as described.

150. In an adding machine, the combination with adding and printing mechanism, a laterally movable paper carriage coöperating with the printing mechanism, a device controlled by the movements of the paper carriage for throwing the adding mechanism of the machine out of action, and means independent of the carriage for rendering said device inoperative at the will of the operator; substantially as described.

151. In an adding machine, the combination with adding and printing mechanism, a laterally movable paper carriage coöperating with the printing mechanism, a device controlled by the movements of the paper carriage for throwing the adding mechanism of the machine out of action, and means for locking said device in inoperative position; substantially as described.

152. In an adding machine, the combination with adding and printing mechanism, a laterally movable paper carriage coöperating with the printing mechanism, a device controlled by the movements of the paper carriage for throwing the adding mechanism of the machine out of action, an operating lever connected with said device and actuated by the carriage, and means for holding said lever to inoperative position; substantially as described.

153. In an adding machine, the combination with adding and printing mechanism, a laterally movable paper carriage coöperating with the printing mechanism, a device controlled by the movements of the paper carriage for throwing the adding mechanism of the machine out of action, an operating lever connected with said device and actuated by the carriage, and a latch for locking said lever to inoperative position; substantially as described.

154. In an adding machine, the printing and adding mechanism thereof in combination with mechanism normally in position to eliminate the adding function of the machine and adapted to be rendered inoperative; substantially as described.

155. In an adding machine, the printing and adding mechanism thereof in combination with mechanism normally in position to eliminate the adding function of the machine, and means for rendering said latter mechanism inoperative at will; substantially as described.

156. In an adding machine, the printing and adding mechanism thereof in combination with mechanism normally spring-pressed into position to eliminate the adding function of the machine, and means for rendering said device inoperative against the spring tension; substantially as described.

157. In an adding machine, the combination of printing and adding mechanism, a device normally in position to eliminate the adding function of the machine, and means controlling the operation of the printing mechanism to print a total and in coöperative relation with said device; substantially as described.

158. In an adding machine, the combination of printing and adding mechanism, means controlling the operation of the printing mechanism to print a total, and a device normally coöperating with said means to eliminate the adding function of the machine; substantially as described.

159. In an adding machine, the combination of printing and adding mechanism, a "total" key and connections controlling the operation of the printing mechanism to print a total, a device normally coöperating with the "total" key connections to eliminate the adding function of the machine, and means for rendering said device inoperative; substantially as described.

160. In an adding machine, the combination of printing and adding mechanism, a movable paper carriage coöperating with the printing mechanism, and means normally coöperating with the adding mechanism to eliminate its function from the machine; substantially as described.

161. In an adding machine, the combination of printing and adding mechanism, a movable paper carriage coöperating with the printing mechanism, a device normally operating to eliminate the function of the adding mechanism of the machine, and means for rendering said device inoperative; substantially as described.

162. In an adding machine, the combination of printing and adding mechanism, a movable paper carriage coöperating with the printing mechanism, a device normally operating to eliminate the function of the adding mechanism of the machine and controlled by the paper carriage; substantially as described.

163. In an adding machine, the combination of printing and adding mechanism, a longitudinally movable paper carriage, means for bringing the carriage to different columnar positions, means for eliminating the adding function of the machine, and means whereby more than one separate number may be printed at one operation of the printing mechanism; substantially as described.

164. In an adding machine, the combination of printing and adding mechanism, a longitudinally movable paper carriage, means for bringing the carriage to different columnar positions, means for controlling the adding function of the machine, and means whereby more than one separate amount may be printed at one operation of the printing mechanism; substantially as described.

165. In an adding machine, the combination of printing and adding mechanism, a longitudinally movable paper carriage, means for bringing the carriage to different columnar positions, means for controlling the adding function of the machine, means whereby more than one separate amount may be printed at one operation of the printing mechanism, and means for feeding the paper forward; substantially as described.

166. In an adding machine, the combination of printing and adding mechanism, a longitudinally movable paper carriage, means for bringing the carriage to different columnar positions, means for eliminating the adding function of the machine, and means whereby more than one separate number may be printed at one operation of the printing mechanism; substantially as described.

167. In an adding machine, the combination of printing and adding mechanism, a longitudinally movable paper carriage, means for bringing the carriage to different columnar positions, means for controlling the accumulating or non-accumulating condition of the machine, means whereby more than one separate amount may be printed at one operation of the printing mechanism, and means for feeding paper forward; substantially as described.

168. In an adding machine the combination of printing and adding mechanism, multiple-key-bank mechanism controlling the same, a longitudinally movable paper carriage, paper feeding mechanism therefor, means for bringing the carriage to different columnar positions, and means for eliminating and restoring the functions of adding and paper feeding; substantially as described.

169. In an adding machine the combination of printing and adding mechanism, multiple key-bank mechanism controlling the same, a longitudinally movable paper carriage, paper feeding mechanism therefor, means for bringing the carriage to different columnar positions, means for eliminating the functions of adding and paper feeding while the carriage is in one position, and for restoring the functions of adding and paper feeding when the carriage is shifted to a different position, so that a number and an amount may be printed on the same horizontal line; substantially as described.

170. In an adding machine the combination of printing and adding mechanism, a longitudinally movable paper carriage, paper feeding mechanism therefor, means for bringing the carriage to different columnar positions, means for eliminating the functions of adding and paper feeding while the carriage is in one position, and for restoring the functions of adding and paper feeding when the carriage is shifted to a d   erent position, and means for printing a plurality of separate numbers and a plurality of separate amounts on the same horizontal line, each set of numbers and each set of amounts being adapted to be printed at one operation of the machine; substantially as described.

171. In an adding machine the combination of printing and adding mechanism, a longitudinally movable or shiftable paper carriage, paper feeding mechanism therefor, and means dependent upon the particular position of the carriage for controlling the functions of adding and paper feeding, so that the same may be made operative or inoperative at will; substantially as described.

172. In an adding machine the combination of printing and adding mechanism, a longitudinally movable or shiftable paper carriage, and means dependent upon the particular position of the carriage for controlling the functions of adding and carriage shift, so that the same may be made operative or inoperative at will; substantially as described.

173. In an adding machine the combination of printing and adding mechanism, a longitudinally movable or shiftable paper carriage, paper feeding mechanism therefor, and means dependent upon the particular position of the carriage for controlling the functions of adding, paper feeding and carriage shift, so that the same may be made operative or inoperative at will; substantially as described.

174. In an adding machine the combination of printing and adding mechanism, a longitudinally movable or shiftable paper carriage, and means for controlling the functions of adding and carriage shift by the position of the carriage, so that the same may be made operative or inoperative at will; substantially as described.

175. In an adding machine the combination of printing and adding mechanism, a longitudinally movable paper carriage, paper feeding mechanism therefor, and means for controlling the functions of adding and paper feed by the position of the carriage, so that the same may be made operative or inoperative at will; substantially as described.

176. In an adding machine the combination of printing and adding mechanism, a longitudinally movable paper carriage, paper feeding mechanism therefor, and means for controlling the functions of adding, paper feeding and carriage shift by the position of the carriage, so that the same may be made operative or inoperative at will; substantially as described.

177. In combination in an adding machine, adding mechanism, printing mechanism, including setting up means and impression means, multiple key bank mechanism controlling said adding, setting up and impression means, a hand lever for operating the impression means, a shiftable carriage with means for shifting the same from the hand lever, and automatic means under the control of the carriage for throwing the adding means out of operation, substantially as described.

178. In combination printing mechanism including a paper carriage, adding mechanism, multiple key-bank mechanism, connections therefrom to the adding mechanism independent of the carriage for operating the same and automatic means for throwing the adding mechanism out of operative connection with the keys, substantially as described.

179. In combination printing mechanism, adding mechanism, a paper carriage, line space mechanism on said carriage and automatic means under control of the paper carriage for throwing the adding mechanism and the line space mechanism into and out of operation, substantially as described.

180. In combination with printing mechanism a paper carriage, paper feed mechanism and adjustable means for throwing the paper feed means out of operation automatically when the carriage shifts to a certain predetermined position, said throw out means being rendered effective by the longitudinal movement of the carriage substantially as described.

181. In an adding machine, the combination of printing and adding mechanism, a laterally movable paper carriage coöperating with the printing mechanism, totalizing mechanism controlling the operation of the printing mechanism to print a total, and means controlled by the movements of the paper carriage and coöperating with the totalizing mechanism to throw the adding mechanism out of action; substantially as described.

182. In an adding machine, the combination of printing and adding mechanism, a laterally movable paper carriage coöperating with the printing mechanism, totalizing mechanism controlling the operation of the printing mechanism to print a total, and means mounted and adjustable on the paper carriage and coöperating with the totalizing mechanism for rendering the adding mechanism operative or inoperative according to the particular position of the carriage; substantially as described.

183. In a machine of the character described the combination with suitable driving mechanism, of a laterally shiftable paper carriage in which the paper may be moved longitudinally, and means for so moving said paper, said means comprising two divisions, one on the carriage so as to shift laterally therewith and the other permanently associated with the driving mechanism of the machine so as to be uniformly actuated thereby, and these two divisions of said paper-moving means depending for coöperative relationship upon the lateral position of the carriage.

184. In a machine of the character described the combination, with suitable driving mechanism, of a laterally shiftable paper carriage in which the paper may be moved longitudinally, and means for so moving said paper, said means comprising two divisions, one on the carriage so as to shift laterally therewith and the other permanently associated with the driving mechanism of the machine so as to be uniformly actuated thereby, and said first mentioned division moving into and out of coöperative relationship with the other division as the carriage is shifted.

185. In a machine of the character described the combination, with suitable driving mechanism, of a laterally shiftable paper carriage, and means for shifting the same, said means comprising two divisions, one on the carriage, so as to shift laterally therewith and the other permanently associated with the driving mechanism of the machine, so as to be uniformly actuated thereby, and these two divisions of said carriage-shifting means depending for coöperative relationship upon the lateral position of the carriage.

186. In a machine of the character described the combination, with suitable driving mechanism, of a laterally shiftable paper carriage in which the paper may be moved longitudinally, and means for so moving said paper and for shifting the carriage, said two means each comprising two divisions, one on the carriage, so as to shift laterally therewith, and the other permanently associated with the driving mechanism of the machine so as to be uniformly actuated thereby, and these two divisions of said paper moving and carriage-shifting means depending for coöperative relationship upon the lateral position of the carriage.

187. In a machine of the character described, the combination with, a differentially movable member, manipulative amount-determining means controlling the same, an accumulator to coöperate with said differential member, means for maintaining said accumulator out of coöperative relation with said differential member during the latter's advance from normal and for establishing such coöperative relation during the return of said member; of a laterally shifting paper-carriage, and means associated therewith for preventing the establishment of coöperative relationship between the accumulator and the differential member during the latter's return to normal.

188. In a machine of the character described, the combination with, a differentially movable member, manipulative amount-determining means controlling the same, an accumulator to coöperate with said differential member; the two being relatively movable bodily to establish and disestablish coöperative relationship, means for maintaining said accumulator out of coöperative relation with said differential member during the latter's advance from normal and for establishing such coöperative relation during the return of said member; of a laterally shifting paper-carriage, and means associated therewith for preventing the establishment of coöperative relationship between the accumulator and the differential member during the latter's return to normal.

189. In a machine of the character described, the combination with, a differentially movable member in the form of a rack, manipulative amount-determining means controlling the same, an accumulator gear to coöperate with said rack, means for maintaining said accumulator gear out of coöperative relation with said differential member during the latter's advance from normal and for establishing such coöperative relation during the return of said member; of a laterally shifting paper-carriage, and means associated therewith for preventing the establishment of coöperative relationship between the accumulator gear and the differential member during the latter's return to normal.

190. In a machine of the character described, the combination with, a differentially movable member in the form of a rack, manipulative amount-determining means controlling the same, an accumulator gear to coöperate with said rack, the two being relatively movable bodily to establish and disestablish coöperative relationship, means for maintaining said accumulator gear out of coöperative relation with said differential member during the latter's advance from normal and for establishing such coöperative relation during the return of said member; of a laterally shifting paper-carriage, and means associated therewith for preventing the establishment of coöperative relationship between the accumulator gear and the differential member during the latter's return to normal.

191. The combination with totalizer wheels, of key-controlled devices including racks designed to engage with and be disengaged from the wheels of the totalizer, a laterally shiftable carriage, and means whereby when said carriage is in one of its shifted positions said racks are prevented from becoming engaged with the totalizer; substantially as described.

192. The combination with totalizer wheels, of key-controlled devices including racks which are designed to be engaged with and disengaged from the wheels of the totalizer, a carriage, printing type, means for making printing impressions upon the paper arranged in said carriage, and means whereby when the carriage is in one of its positions the totalizer is engaged by the racks of the key-controlled devices; substantially as described.

193. A machine capable of printing a plurality of columns on the same piece of paper, said machine having a totalizer and being provided with means whereby the items of one column only are accumulated in the totalizer, and a total key for effecting a printing of the total of the items under the column containing the items which are accumulated in the totalizer; substantially as described.

194. In a machine of the character described, the combination of line-spacing mechanism; column-spacing mechanism; operating means common to said two mechanisms; and means for automatically, as an incident to operation of said operating means, disconnecting the same from one of said mechanisms and connecting said operating means to the other of said mechanisms.

195. The combination of a laterally movable paper carriage, means for printing upon paper therein a plurality of variously selected numerals side by side on a horizontal line in one and the same operation of the machine, a spring drawing the carriage in one direction, stops for determining the lateral position of the carriage, and means for automatically disengaging the stops in the same operation of the machine that prints an amount.

HEBER C. PETERS.

Witnesses:
S. E. HIBBEN,
LOUIS B. ERWIN.

---

It is hereby certified that in Letters Patent 1,028,133, granted June 4, 1912, upon the application of Heber C. Peters, of Indianapolis, Indiana, for an improvement in "Calculating-Machines", errors appear in the printed specification requiring correction as follows: Page 15, line 115, for the words " 'total' key connections" read *totalizing mechanism;* page 16, lines 83-84, for the words " 'total' key connections" read *totalizing mechanism;* page 25, lines 129-130, strike out the article and words "a supporting or track frame for the carriage;" page 26, lines 15-16 and lines 31-32, strike out the article and words "a supporting or track frame for the carriage;" and that the said Letters Patent should be read with these corrections therein that the same may conform to the records of the case in the Patent Office.

Signed and sealed this 6th day of August, A. D., 1912.

[SEAL.]

C. C. BILLINGS,
*Acting Commissioner of Patents.*